US007154718B1

(12) United States Patent
Finlay, Sr. et al.

(10) Patent No.: US 7,154,718 B1
(45) Date of Patent: Dec. 26, 2006

(54) PROTECTION DEVICE WITH POWER TO RECEPTACLE CUT-OFF

(75) Inventors: David A. Finlay, Sr., Marietta, NY (US); Kent Morgan, Groton, NY (US); Patrick J. Murphy, Marcellus, NY (US); Dejan Radosavljevic, Syracuse, NY (US); Jeffrey C. Richards, Baldwinsville, NY (US); Gerald R. Savicki, Jr., Canastota, NY (US); Richard Weeks, Little York, NY (US); Gary Wilson, Syracuse, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 274 days.

(21) Appl. No.: 10/900,769

(22) Filed: Jul. 28, 2004

(51) Int. Cl.
*H02H 3/00* (2006.01)

(52) U.S. Cl. .......................................... 361/42

(58) Field of Classification Search .................. 361/42
See application file for complete search history.

(56) References Cited

U.S. PATENT DOCUMENTS

| | | | |
|---|---|---|---|
| 5,072,328 | A | 12/1991 | Dvorak et al. |
| 5,202,662 | A | 4/1993 | Bienwald et al. |
| 5,459,630 | A | 10/1995 | MacKenzie et al. |
| 5,517,165 | A | 5/1996 | Cook |
| 5,844,759 | A | 12/1998 | Hirsh et al. |
| 6,246,558 | B1 | 6/2001 | DiSalvo et al. |
| 6,288,882 | B1 | 9/2001 | DiSalvo et al. |
| 6,407,893 | B1 | 6/2002 | Neiger et al. |
| 6,437,953 | B1 | 8/2002 | DiSalvo et al. |
| 6,477,022 | B1 | 11/2002 | Ennis et al. |
| 6,487,052 | B1 | 11/2002 | Macpherson et al. |
| 6,525,541 | B1 | 2/2003 | Leopold |
| 6,657,834 | B1 | 12/2003 | DiSalvo |
| 6,671,145 | B1 | 12/2003 | Germain et al. |
| 6,717,782 | B1 | 4/2004 | DiSalvo et al. |
| 6,724,591 | B1 | 4/2004 | Clarey et al. |
| 6,771,152 | B1 | 8/2004 | Germain et al. |
| 6,788,173 | B1 | 9/2004 | Germain et al. |
| 6,807,035 | B1 | 10/2004 | Baldwin et al. |
| 6,807,036 | B1 | 10/2004 | Baldwin |
| 6,828,886 | B1 | 12/2004 | Germain et al. |

(Continued)

*Primary Examiner*—Stephen W. Jackson
*Assistant Examiner*—Boris Benenson
(74) *Attorney, Agent, or Firm*—Bond, Schoeneck & King PLLC; Daniel P. Malley

(57) ABSTRACT

The present invention is directed to an electrical wiring protection device that includes a housing assembly having at least one receptacle. The receptacle is configured to receive plug contact blades inserted therein. The housing assembly includes a hot line terminal, a neutral line terminal, a hot load terminal, and a neutral load terminal. A set of receptacle contacts is disposed in the housing assembly and in communication with the receptacle. The receptacle contacts includes a hot user-accessible load contact and a neutral user accessible load contact. A fault detection circuit is coupled to the test assembly. The fault detection circuit is configured to detect at least one fault condition and provide a fault detect signal in response thereto. A four-pole interrupting contact assembly is coupled to the fault detection circuit and includes a set of four-pole interrupting contacts. A reset mechanism is coupled to the four-pole interrupting contact assembly. The reset mechanism includes a reset button and a reset actuator configured to reestablish electrical continuity between the first pair of hot contacts, the second pair of hot contacts, the first pair of neutral contacts, and the second pair of neutral contacts in response to a reset stimulus.

63 Claims, 15 Drawing Sheets

U.S. PATENT DOCUMENTS

| | | | |
|---|---|---|---|
| 6,829,124 | B1 | 12/2004 | Leopold et al. |
| 6,831,819 | B1 | 12/2004 | Nemir et al. |
| 6,867,954 | B1 | 3/2005 | Wu et al. |
| 6,930,574 | B1 | 8/2005 | Gao |
| 6,946,935 | B1 | 9/2005 | Wu et al. |
| 6,954,125 | B1 | 10/2005 | Wu et al. |
| 6,998,945 | B1 | 2/2006 | Huang et al. |
| 7,019,952 | B1 | 3/2006 | Huang et al. |
| 7,031,126 | B1 | 4/2006 | Bonilla et al. |
| 2005/0001607 | A1 | 1/2005 | Berland et al. |
| 2005/0018062 | A1 | 1/2005 | Wu et al. |
| 2005/0117264 | A1 | 6/2005 | Aromin |
| 2005/0140476 | A1 | 6/2005 | Gao |

PROTECTION DEVICE WITH POWER TO RECEPTACLE CUT-OFF

BACKGROUND OF THE INVENTION

1. Field of the Invention

The present invention relates generally to protection devices, and particularly to protection devices having power to the receptacle cut-off features.

2. Technical Background

Most residential, commercial, or industrial buildings include one or more breaker panels that are configured to receive AC power from a utility source. The breaker panel distributes AC power to one or more branch electric circuits installed in the building. The electric circuits transmit AC power to one or more electrically powered devices, commonly referred to in the art as load circuits. Each electric circuit typically employs one or more electric circuit protection devices. Examples of such devices include ground fault circuit interrupters (GFCIs), arc fault circuit interrupters (AFCIs), or both GFCIs and AFCIs. Further, AFCI and GFCI protection may be included in one protective device.

The circuit protection devices are configured to interrupt the flow of electrical power to a load circuit under certain fault conditions. When a fault condition is detected, the protection device eliminates the fault condition by interrupting the flow of electrical power to the load circuit by causing interrupting contacts to break the connection between the line terminals and load terminals. As indicated by the name of each respective device, an AFCI protects the electric circuit in the event of an arc fault, whereas a GFCI guards against ground faults. An arc fault is a discharge of electricity between two or more conductors. An arc fault may be caused by damaged insulation on the hot line conductor or neutral line conductor, or on both the hot line conductor and the neutral line conductor. The damaged insulation may cause a low power arc between the two conductors and a fire may result. An arc fault typically manifests itself as a high frequency current signal. Accordingly, an AFCI may be configured to detect various high frequency signals and de-energize the electrical circuit in response thereto.

With regard to GFCIs, a ground fault occurs when a current carrying (hot) conductor creates an unintended current path to ground. A differential current is created between the hot/neutral conductors because some of the current flowing in the circuit is diverted into the unintended current path. The unintended current path represents an electrical shock hazard. Ground faults, as well as arc faults, may also result in fire. GFCIs intended to prevent fire have been called ground-fault equipment protectors (GFEPs.)

Ground faults occur for several reasons. First, the hot conductor may contact ground if the electrical wiring insulation within a load circuit becomes damaged. This scenario represents a shock hazard. For example, if a user comes into contact with a hot conductor within an appliance while simultaneously contacting ground, the user will experience a shock. A ground fault may also result from equipment coming into contact with water. A ground fault may also result from damaged insulation within the electrical power distribution system.

As noted above, a ground fault creates a differential current between the hot conductor and the neutral conductor. Under normal operating conditions, the current flowing in the hot conductor should equal the current in the neutral conductor. Accordingly, GFCIs are typically configured to compare the current in the hot conductor to the return current in the neutral conductor by sensing the differential current between the two conductors. When the differential current exceeds a predetermined threshold, usually about 6 mA, the GFCI typically responds by interrupting the circuit. Circuit interruption is typically effected by opening a set of contacts disposed between the source of power and the load. The GFCI may also respond by actuating an alarm of some kind.

Another type of ground fault may occur when the load neutral terminal, or a conductor connected to the load neutral terminal, becomes grounded. This condition does not represent an immediate shock hazard. As noted above, a GFCI will trip under normal conditions when the differential current is greater than or equal to approximately 6 mA. However, when the load neutral conductor is grounded the GFCI becomes de-sensitized because some of the return path current is diverted to ground. When this happens, it may take up to 30 mA of differential current before the GFCI trips. This scenario represents a double-fault condition. In other words, when the user comes into contact with a hot conductor (the first fault) at the same time as contacting a neutral conductor that has been grounded on the load side (the second fault), the user may to experience serious injury or death.

The aforementioned protective devices may be conveniently packaged in receptacles that are configured to be installed in wall boxes. The protective device may be configured for various electrical power distribution systems, including multi-phase distribution systems. A receptacle typically includes input terminals that are configured to be connected to an electric branch circuit. Accordingly, the receptacle includes at least one hot line terminal and may include a neutral line terminal for connection to the hot power line and a neutral power line, respectively. The hot power line(s) and the neutral power line, of course, are coupled to the breaker panel. The receptacle also includes output terminals configured to be connected to a load circuit. In particular, the receptacle has feed-through terminals that include a hot load terminal and a neutral load terminal. The receptacle also includes user accessible plug receptacles connected to the feed through terminals. Accordingly, load devices equipped with a cord and plug may access AC power by way of the user accessible plug receptacles.

However, there are drawbacks associated with hard-wiring the user accessible plug receptacles to the feed-through terminals. As noted above, when a fault condition is detected in the electrical distribution system, a circuit interrupter breaks the electrical coupling between the line and load terminals to remove AC power from the load terminals. If the protective device is wired correctly, AC power to the user accessible plug receptacles is also removed. However, power to the user accessible plug receptacles may not be removed if the protective device is miswired.

In particular, a miswire condition exists when the power lines and the are connected to the hot output terminal and the neutral output terminal, respectively. For 120 VAC distribution systems, the hot power line and the neutral power line are configured to be connected to the hot line terminal and the neutral line terminal, respectively. If the electrical distribution system includes load wires, the miswire is completed by connecting the load wires to the line terminals. A miswire condition may represent a hazard to a user when a cord connected load is plugged into the user accessible receptacle included in the device. Even if the circuit is interrupted in response to a true or simulated fault condition, AC power is present at the terminals of the receptacle because the feed-thru terminals and the receptacle terminals are hard-wired. Thus, the user is not protected if there is a fault condition in the cord-connected load.

Besides miswiring, failure of the device to interrupt a true fault condition or simulated fault condition may be due to the device having an internal fault condition, also known as an end of life condition. The device includes electro-mechanical components that are subject to reaching end of life, including electronic components can open circuit or short circuit, and mechanical components such as the contacts of the circuit interrupter that can become immobile due to welding, and the like.

In one approach that has been considered, the protective device is configured to trip in response to a miswire condition. Thus, if the power source of the electrical distribution system is connected to the load terminals (i.e., a line-load miswire condition), the circuit interrupting contacts will break electrical connection. The installer is made aware of the miswired condition when he discovers that power is not available to the downstream receptacles coupled to the miswired receptacle. After the miswiring condition is remedied, the interrupting contacts in the device can be reset. One drawback to this approach becomes evident when the protective device is not coupled to any downstream receptacles. In this scenario, the installer may not become aware of the miswire condition.

Accordingly, there is a need to deny power to the user accessible receptacles when the device is tripped. This safety feature is especially needed when the GFCI is miswired.

SUMMARY OF THE INVENTION

The present invention is configured to deny power to the user accessible plug receptacles when the device is tripped. Accordingly, the present invention provides a safety feature that eliminates a hazardous condition that may arise when the device is miswired.

One aspect of the present invention is directed to an electrical wiring protection device that includes a housing assembly having at least one receptacle. The at least one receptacle is configured to receive plug contact blades inserted therein. The housing assembly includes a hot line terminal, a neutral line terminal, a hot load terminal, and a neutral load terminal. At least one set of receptacle contacts is disposed in the housing assembly and in communication with the at least one receptacle. The at least one set of receptacle contacts includes a hot user-accessible load contact and a neutral user accessible load contact. A fault detection circuit is coupled to the test assembly. The fault detection circuit is configured to detect at least one fault condition and provide a fault detect signal in response thereto. a four-pole interrupting contact assembly is coupled to the fault detection circuit. The four-pole interrupting contact assembly includes at least one solenoid coupled to the fault detection circuit. An armature is coupled to the at least one solenoid. The armature is configured to move in only a first direction in response to any force generated by the at least one solenoid. A set of four-pole interrupting contacts include a first pair of hot contacts coupling the hot line terminal and the hot load terminal, a second pair of hot contacts coupling the hot line terminal to the hot user-accessible load contact, a first pair of neutral contacts coupling the neutral line terminal and the neutral load terminal, and a second pair of neutral contacts coupling the neutral line terminal to the neutral user-accessible load contact. The set of four-pole interrupting contacts is configured to provide electrical continuity between the first pair of hot contacts, the second pair of hot contacts, the first pair of neutral contacts, and the second pair of neutral contacts in a coupled state. The set of four-pole interrupting contacts is driven by the armature movement in the first direction to thereby interrupt electrical continuity between the first pair of hot contacts, the second pair of hot contacts, the first pair of neutral contacts, and the second pair of neutral contacts in a tripped state. A reset mechanism is coupled to the four-pole interrupting contact assembly. The reset mechanism includes a reset button and a reset actuator that selectively provides a reset stimulus in response to an actuation of the reset button. The first pair of hot contacts, the second pair of hot contacts, the first pair of neutral contacts, and the second pair of neutral contacts are necessarily driven into the coupled state by the reset stimulus.

In another aspect, the present invention includes an electrical wiring protection device that includes a housing assembly having at least one receptacle. The at least one receptacle is configured to receive plug contact blades inserted therein. The housing assembly includes a hot line terminal, a neutral line terminal, a hot load terminal, and a neutral load terminal. At least one set of receptacle contacts is disposed in the housing assembly and in communication with the at least one receptacle. The at least one set of receptacle contacts includes a hot user-accessible load contact and a neutral user accessible load contact. A test assembly is coupled to the hot line terminal and the neutral line terminal, the test assembly being configured to generate a simulated fault condition. A fault detection circuit is coupled to the test assembly. The fault detection circuit is configured to detect at least one fault condition and provide a fault detect signal in response thereto. The at least one fault condition includes the simulated fault condition. A four-pole interrupting contact assembly is coupled to the fault detection circuit and includes a set of four-pole interrupting contacts having a first pair of hot contacts coupling the hot line terminal and the hot load terminal, a second pair of hot contacts coupling the hot line terminal to the hot user-accessible load contact, a first pair of neutral contacts coupling the neutral line terminal and the neutral load terminal, and a second pair of neutral contacts coupling the neutral line terminal to the neutral user-accessible load contact. The set of four-pole interrupting contacts is configured to provide electrical continuity between the first pair of hot contacts, the second pair of hot contacts, the first pair of neutral contacts, and the second pair of neutral contacts in a coupled state and cause electrical discontinuity between the first pair of hot contacts, the second pair of hot contacts, the first pair of neutral contacts, and the second pair of neutral contacts in a tripped state. A reset mechanism is coupled to the four-pole interrupting contact assembly. The reset mechanism includes a reset button and a reset actuator configured to reestablish electrical continuity between the first pair of hot contacts, the second pair of hot contacts, the first pair of neutral contacts, and the second pair of neutral contacts in response to a reset stimulus. An end-of-life mechanism is coupled to the test assembly. The end-of-life mechanism includes an end-of-life circuit, a third pair of hot contacts coupling the hot line terminal and the hot load terminal, and a third pair of neutral contacts coupling the neutral line terminal and the neutral load terminal. The end-of-life circuit is configured to decouple the third pair of hot contacts and the third pair of neutral contacts if the fault detection circuit fails to transmit the fault detection signal within a predetermined period of time after the simulated fault condition is generated. The end-of-life mechanism is independent of the set of four-pole interrupting contacts.

In another aspect, the present invention includes an electrical wiring protection device that includes a housing assembly having at least one receptacle. The at least one receptacle is configured to receive plug contact blades inserted therein. The housing assembly includes a hot line terminal, a neutral line terminal, a hot load terminal, and a neutral load terminal. At least one set of receptacle contacts is disposed in the housing assembly and in communication with the at least one receptacle. The at least one set of receptacle contacts includes a hot user-accessible load contact and a neutral user accessible load contact. A fault detection circuit is coupled to a test assembly. The fault detection circuit is configured to detect at least one fault condition and provide a fault detect signal in response thereto. A four-pole interrupting contact assembly is coupled to the fault detection circuit. The four-pole interrupting contact assembly includes a first cantilever connected to the hot line terminal at a first end. The first cantilever includes a first cantilever contact disposed thereon at a second end. The first cantilever contact and a hot load terminal contact form a first contact pair of hot contacts configured to couple the hot line terminal and the hot load terminal. A second cantilever is connected to the hot line terminal at the first end and includes a second cantilever contact disposed thereon at the second end. The second cantilever contact and a hot user-accessible load contact form a second contact pair of hot contacts configured to couple the hot line terminal and the hot user-accessible load terminal. A third cantilever is connected to the neutral line terminal at a first end and includes a third cantilever contact disposed thereon at the second end. The third cantilever contact and a neutral load terminal contact form a first contact pair of neutral contacts configured to couple the neutral line terminal and the neutral load terminal. A fourth cantilever is connected to the neutral line terminal at the first end and includes a fourth cantilever contact disposed thereon at the second end. The fourth cantilever contact and a neutral user-accessible load contact form a second contact pair of neutral contacts configured to couple the neutral line terminal and the neutral user-accessible load terminal. A pivoting latch mechanism is configured to drive the first cantilever, the second cantilever, the third cantilever, and the fourth cantilever between a coupled state and a tripped state, whereby the first pair of hot contacts, the second pair of hot contacts, the first pair of neutral contacts, and the second pair of neutral contacts are decoupled in response to the fault detect signal.

In another aspect, the present invention includes an electrical wiring protection device that includes a housing assembly having at least one receptacle. The at least one receptacle is configured to receive plug contact blades inserted therein. The housing assembly includes a hot line terminal, a neutral line terminal, a hot load terminal, and a neutral load terminal. At least one set of receptacle contacts is disposed in the housing assembly and in communication with the at least one receptacle. The at least one set of receptacle contacts includes a hot user-accessible load contact and a neutral user accessible load contact. A fault detection circuit is coupled to a test assembly. The fault detection circuit is configured to detect at least one fault condition and provide a fault detect signal in response thereto. A four-pole interrupting contact assembly is coupled to the fault detection circuit. The four-pole interrupting contacts include a hot tri-contact member configured to provide electrical continuity between the hot line terminal, the hot load terminal, and the hot user-accessible load terminal in a coupled state, and cause electrical discontinuity between the hot line terminal, the hot load terminal, and the hot user-accessible load terminal in a tripped state. The four-pole interrupting contacts also include a neutral tri-contact member configured to provide electrical continuity between the neutral line terminal, the neutral load terminal, and the neutral user-accessible load terminal in a coupled state, and cause electrical discontinuity between the neutral line terminal, the neutral load terminal, and the neutral user-accessible load terminal in a tripped state.

In another aspect, the present invention includes an electrical wiring protection device that includes a housing assembly having at least one receptacle. The at least one receptacle is configured to receive plug contact blades inserted therein. The housing assembly includes a hot line terminal, a neutral line terminal, a hot load terminal, and a neutral load terminal. At least one set of receptacle contacts is disposed in the housing assembly and in communication with the at least one receptacle. The at least one set of receptacle contacts includes a hot user-accessible load contact and a neutral user accessible load contact. A fault detection circuit is coupled to a test assembly. The fault detection circuit is configured to detect at least one fault condition and provide a fault detect signal in response thereto. A four-pole interrupting contact assembly is coupled to the fault detection circuit. The four-pole interrupting contacts includes a hot cantilever assembly having a hot line cantilever connected to the hot line terminal. The hot line cantilever includes a first hot contact disposed thereon. A fixed second hot contact is coupled to the hot user-accessible load terminal. A hot load cantilever is connected to the hot load terminal and includes a third hot contact disposed thereon. The first hot contact, the second hot contact, and the third hot contact are aligned and configured to provide electrical continuity between the hot line terminal, the hot load terminal, and the hot user-accessible load terminal in a coupled state, and cause electrical discontinuity between the hot line terminal, the hot load terminal, and the hot user-accessible load terminal in a tripped state. A neutral cantilever assembly includes a neutral line cantilever that is connected to the neutral line terminal and has a first neutral contact disposed thereon. A fixed second neutral contact is coupled to the neutral user-accessible load terminal. A neutral load cantilever is connected to the neutral load terminal and includes a third neutral contact disposed thereon. The first neutral contact, the second neutral contact, and the third neutral contact are aligned and configured to provide electrical continuity between the neutral line terminal, the neutral load terminal, and the neutral user-accessible load terminal in a coupled state, and cause electrical discontinuity between the neutral line terminal, the neutral load terminal, and the neutral user-accessible load terminal in a tripped state.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
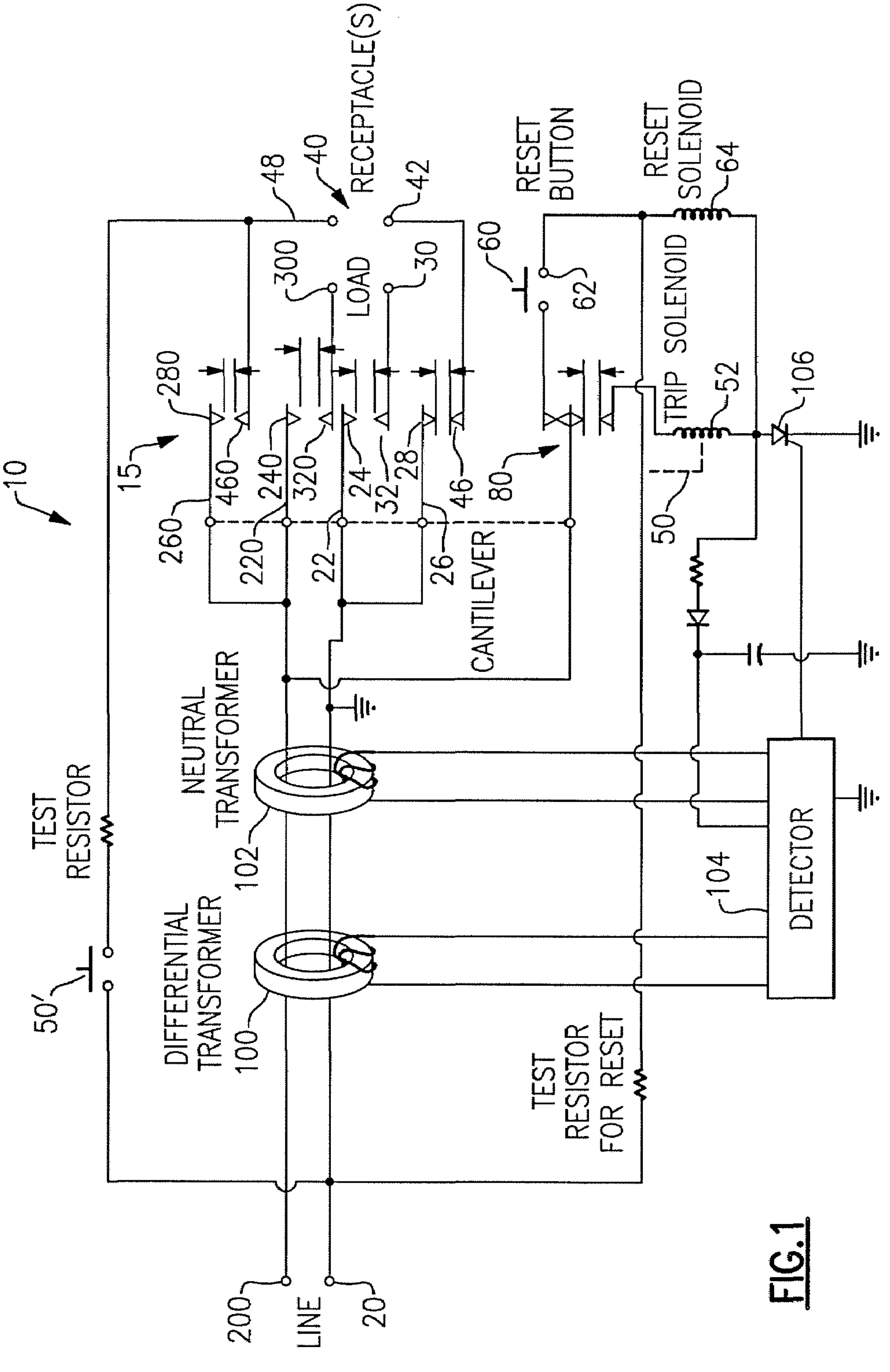
FIG. 1 is a block diagram of an electrical wiring device in accordance with a first embodiment of the present invention.

Reference will now be made in detail to the present embodiments of the invention, examples of which are illustrated in the accompanying drawings. Wherever possible, the same reference numbers will be used throughout the drawings to refer to the same or like parts. An exemplary embodiment of the wiring device of the present invention is shown in FIG. 1, and is designated generally throughout by reference numeral 10.

As embodied herein, and depicted in FIG. 1, a block diagram of an electrical wiring device 10 in accordance with a first embodiment of the present invention is disclosed. While FIG. 1 includes a GFCI, the present invention is equally applicably to AFCIs and/or other protective devices. The wiring device 10 includes a tripping mechanism that includes ground fault sensor 100 and grounded neutral sensor 102 coupled to detector 104. Detector 104 is coupled to silicon controlled rectifier (SCR) 106. SCR 106 is turned on in response to a detection signal from detector 104. SCR 106, in turn, signals trip solenoid 52 to actuate a pivotal latch mechanism 80 to open the contacts in contact assembly 15.

With regard to contact assembly 15, neutral line terminal 20 is connected to cantilever member 22 and cantilever member 26. Cantilevers 22 and 26 are coupled to latch mechanism 80. Cantilever member 22 includes a moveable contact 24. In the reset position, moveable contact 24 is configured to mate with stationary contact 32. Stationary contact 32 is coupled to neutral load feed-through terminal 30. Cantilever member 26 includes moveable contact 28. In the reset position, moveable contact 28 is configured to mate with stationary contact 46. Stationary contact 46 is coupled to the neutral contact 42 in receptacle 40. Hot line terminal 200 is connected to cantilever member 220 and cantilever member 260. Cantilevers 220 and 260 are also coupled to latch mechanism 80. Cantilever member 220 includes a moveable contact 240. In the reset position, moveable contact 240 is configured to mate with stationary contact 320, which is coupled to hot load feed-through terminal 300. Cantilever member 260 includes a moveable contact 280. In the reset position, moveable contact 280 is configured to mate with stationary contact 460, which is coupled to the hot contact 48 in receptacle 40.

Accordingly, when SCR 106 signals trip solenoid 52, latch mechanism 80 pulls the cantilevers 22, 26, 220, and 260 such that moveable contacts 24, 28, 240, and 280 are separated from stationary contacts 32, 46, 320, and 460, respectively. When reset button 60 is depressed, reset solenoid 64 is actuated. Solenoid 64 causes latch mechanism 80 to close the aforementioned pairs of contacts to thereby restore AC power.

The reset mechanism includes reset button 60, contacts 62, and reset solenoid 64. When reset button 60 is depressed, contacts 62 are closed to thereby initiate a test procedure. If the test procedure is successful, reset solenoid 64 is actuated, and latch mechanism 80 is toggled to reset device 10. When device 10 has an internal fault condition, the test procedure is unsuccessful, and the circuitry does not transmit a reset signal. The reset solenoid 64 is not actuated, and the device is not reset. As described above, latch mechanism 80 is toggled between the tripped state and the reset state by trip solenoid 52 and reset solenoid 64, respectively.

Latch mechanism 80 may be toggled to the tripped position by the fault detection circuitry, as described above, or by a user accessible test button 50. Alternatively, latch mechanism 80 may be tripped by the fault detection circuitry, as described above, and by an electrical test button 50'. The electrical test button 50' produces a simulated condition configured to test a portion of, or all of, the detection circuitry. A test acceptance signal toggles latch mechanism 80 to the tripped position. The simulated condition may be a test signal or an induced fault signal. Hereinafter, both of these signals will be referred to as simulated fault conditions.

Figure 2:
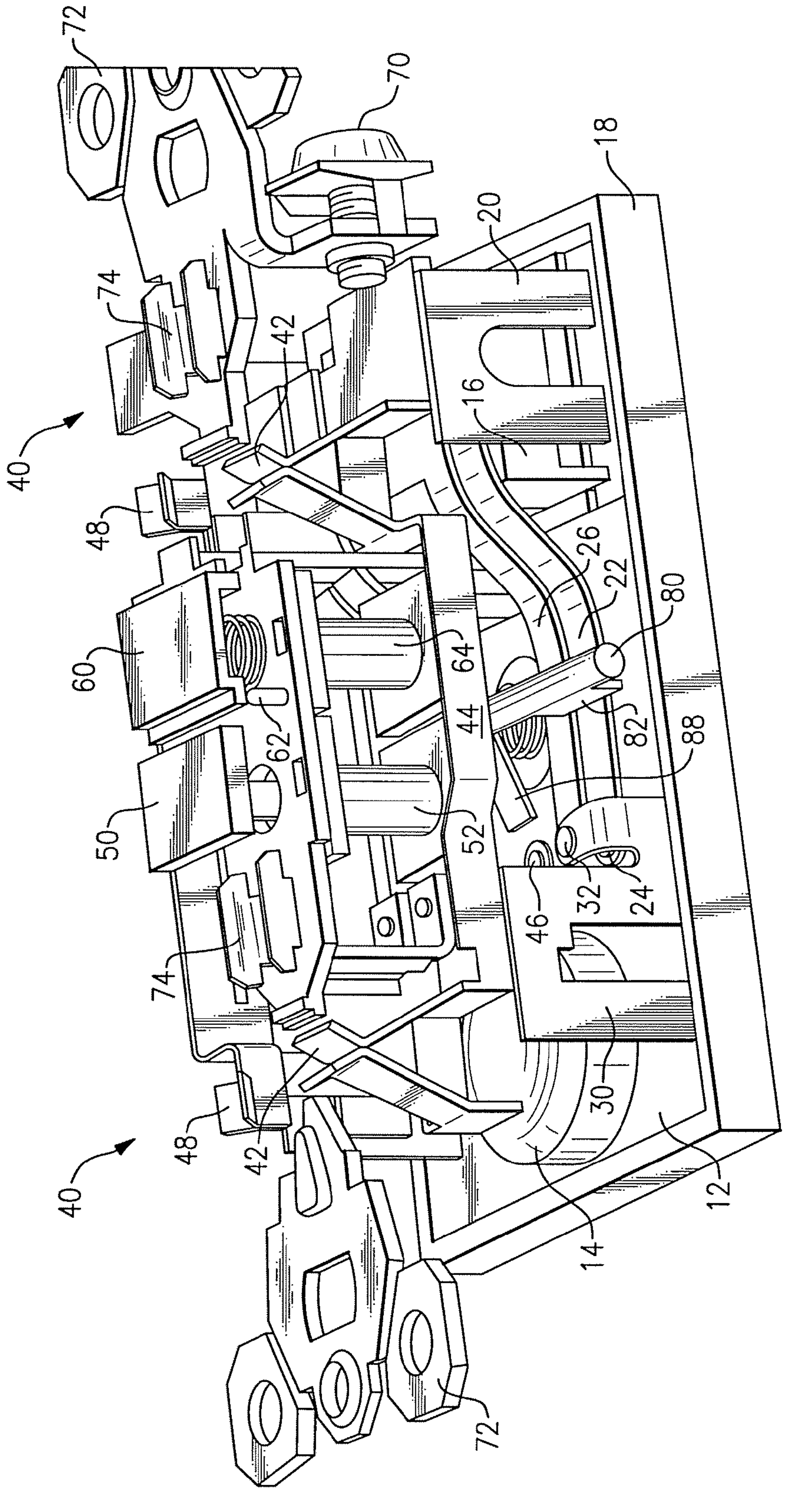
FIG. 2 is a perspective view of the electrical device depicted in FIG. 1.

Referring to FIG. 2, a perspective view of the electrical wiring device shown in FIG. 1 is disclosed. Electrical device 10 includes a circuit board 12 which is mounted on member 18. Movistor 14 and sensor coil assembly 16 houses ground fault sensor 100 and grounded neutral sensor 102 are mounted on circuit board 12. Circuit board 12 includes a protective circuit that is discussed in more detail below. Device 10 is configured to be coupled to AC electrical power by way of line neutral terminal 20 and line hot terminal 200 (not shown in FIG. 2). Power is provided to a load via load neutral terminal 30 and load hot terminal 300 (not shown in FIG. 1). Device 10 also provides power to user plug contacts by way of at least one receptacle 40. Receptacles 40 include neutral contact 42, hot contact 48, and ground contact 74. Ground contact 74 is electrically connected to ground terminal 70 and ground strap 72. Similarly, device 10 and receptacle 40 can be configured for other electrical distribution systems having a single phase or multiple phase power source that include at least one hot terminal and that may include a neutral terminal and/or ground terminal.

Line neutral cantilevers 22, 26 are connected at one end to line neutral terminal 20. At the other end, line cantilever 22 includes a terminal contact 24. In similar fashion, line cantilever 26 includes a terminal contact 28 adjacent to contact 24. Cantilevers 22 and 26 are flexibly connected to latch mechanism 80 by way of wiper arm 82. Load neutral terminal 30 is coupled to load neutral contact 32. Load neutral contact 32 and line neutral contact 24 form a pair of separable contacts. Receptacle neutral contact 42 is connected to member 44. Member 44 includes neutral contact 46. Neutral contact 46 and line neutral contact 28 also form a pair of separable contacts.

Latch mechanism 80 is actuated by test button 50 and reset button 60. Test button 50 is a mechanical actuator that is coupled to latch mechanism 80. When test button 50 is depressed, each separable contact pair is separated to remove power to the feed through terminals and the receptacle terminals. Reset button 60 is an electric switch mechanism that is actuated when button 60 closes contacts 62. Contacts 62 actuates solenoid 64. If the test is successful, each separable contact pair is closed. The operation of dual-solenoids 52, 64 will be discussed below in more detail.

Figure 3:
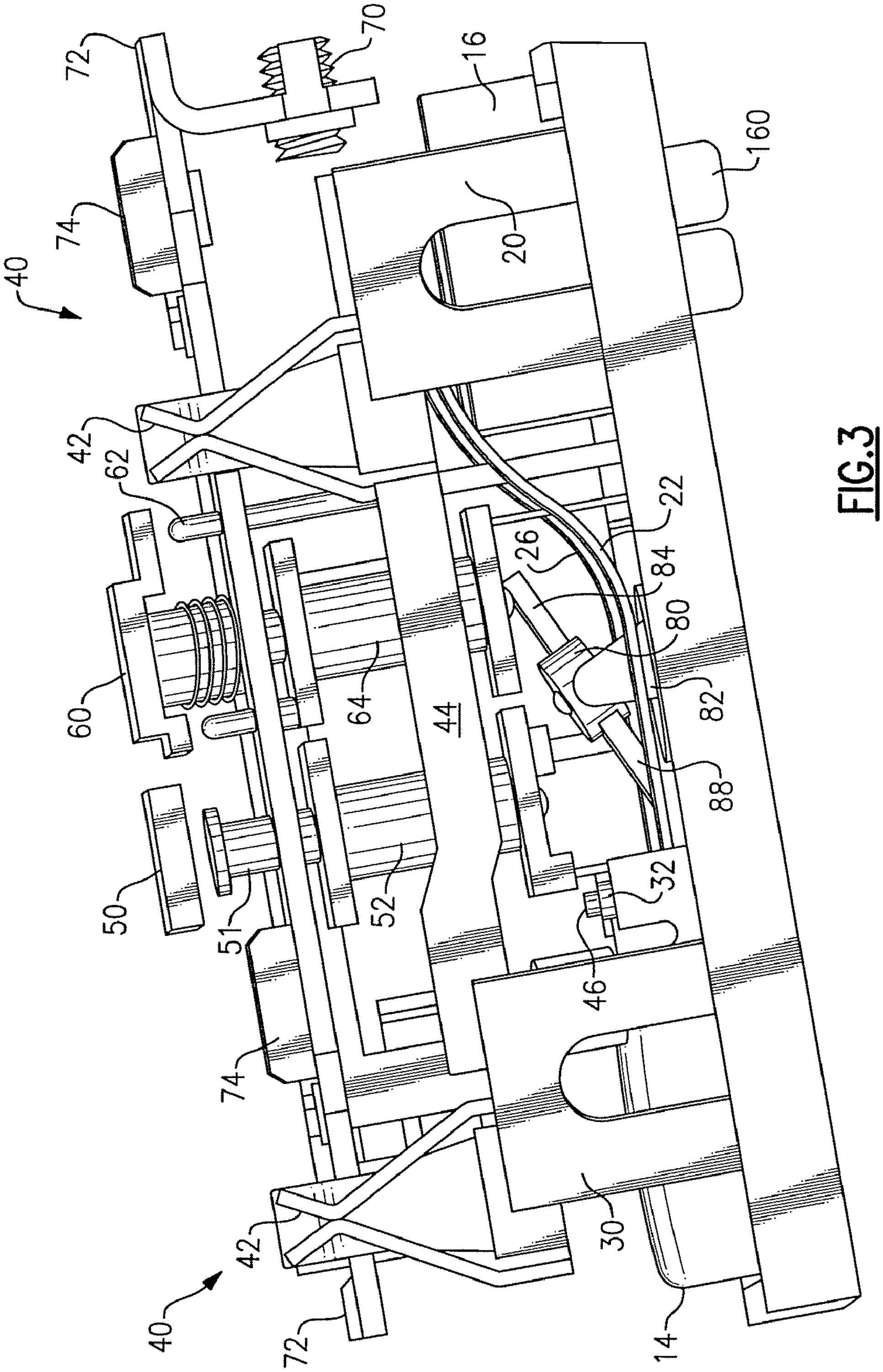
FIG. 3 is a side elevation view of the electrical wiring device depicted in FIG. 1.

Referring to FIG. 3, a side elevation view of the electrical wiring device 10 depicted in FIG. 1 is shown. FIG. 3 depicts a tripped state wherein power is denied to receptacles 40. Note that latch arm 88 is in a downward position such that line neutral contact 24 and line neutral contact 28 are not in contact with load neutral contact 32 and receptacle neutral contact 46, respectively. The reset mechanism operates as follows. When reset button 60 activates reset solenoid 64, latch arm 84 is forced downward, latch arm 88 is directed upward forcing flexible cantilevers 22 and 26 upward as well. This movement forces line neutral contact 24 against load neutral contact 32, and line neutral contact 28 against neutral contact 46.

Figure 4:
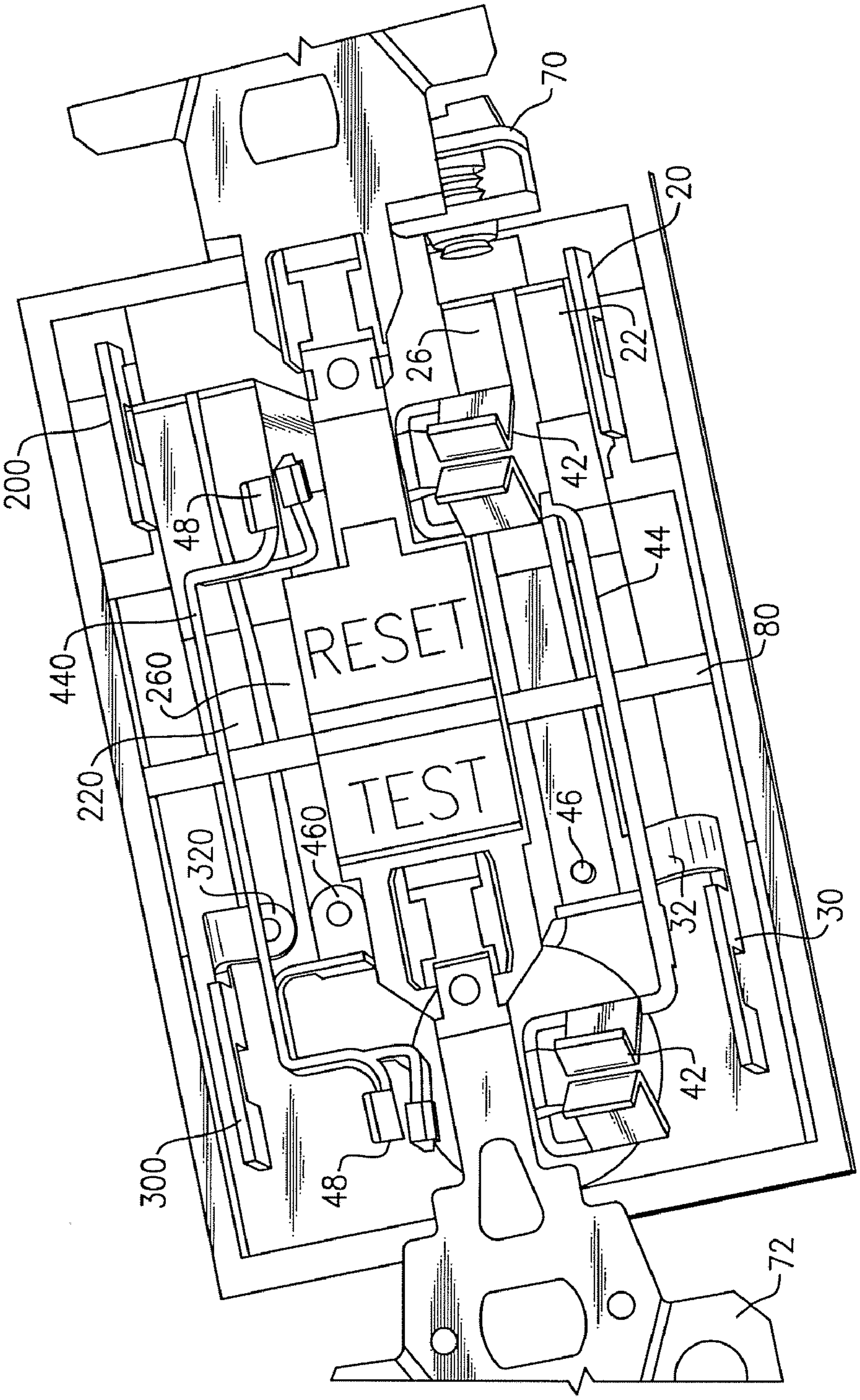
FIG. 4 is a top view of the electrical wiring device depicted in FIG. 1.

Referring to FIG. 4, a top view of the electrical wiring device depicted in FIG. 1 is disclosed. The "hot" side of device 10 is the mirror image of the "neutral" side of device 10. The line hot wire from the electrical distribution system is connected to line hot terminal 200, and the load hot wire is connected to load hot terminal 300. Hot receptacle contacts are connected to member 440. Cantilevers 220 and 260 include moveable hot contacts 240, 280, respectively. Hot contacts 240 and 280 are paired with fixed contacts 320 and 460, respectively. Accordingly, when device 10 is in the tripped state, as described above, contact pair 240/320 and contact pair 280/460 are opened. When latch 80 is toggled by reset button 60, reset solenoid 64 is activated. As a result, flexible cantilevers 220 and 260 are directed upward pressing line hot contact 240 against load hot contact 320, and line hot contact 280 against receptacle hot contact 460.

Referring to FIGS. 2–4, test solenoid 52 includes an armature 51. When solenoid 52 receives a signal from SCR 106, a magnetic force is induced in armature 51 to drive latch arm 88 downward, causing the contacts to separate. When test button 50 is depressed by the user, a mechanical force is applied to move arm 88 downward. Test button 50 and armature 51 may be configured such that the mechanical force applied to button 50 drives latch arm 88 downward. As a result, power is removed from both the feed-through terminals (30, 300) and from the receptacles 40. When reset button 60 is depressed, contacts 62 are closed and a test routine is initiated. The protective circuit disposed on circuit board 12 generates a test signal. The circuit is configured to sense and detect the test signal. If the test signal is successfully detected, the reset solenoid 64 is activated. In response, latch 80 is toggled in the other direction. Cantilevers 22, 26, 220, and 260 are spring-loaded and biased in an upward direction to close the contacts and provide power to the receptacle(s) 40 and feed-through terminals (30,300.) As noted above, if the test is not successful, solenoid 64 is not actuated and the contacts remain open.

In this embodiment, the device is typically tripped before being installed by the user. If the device is miswired by the installer, source power is not available to the reset solenoid due to the tripped condition. The device cannot be reset. As a result, AC power is denied to the receptacles until device 10 is wired correctly.

Figure 5:
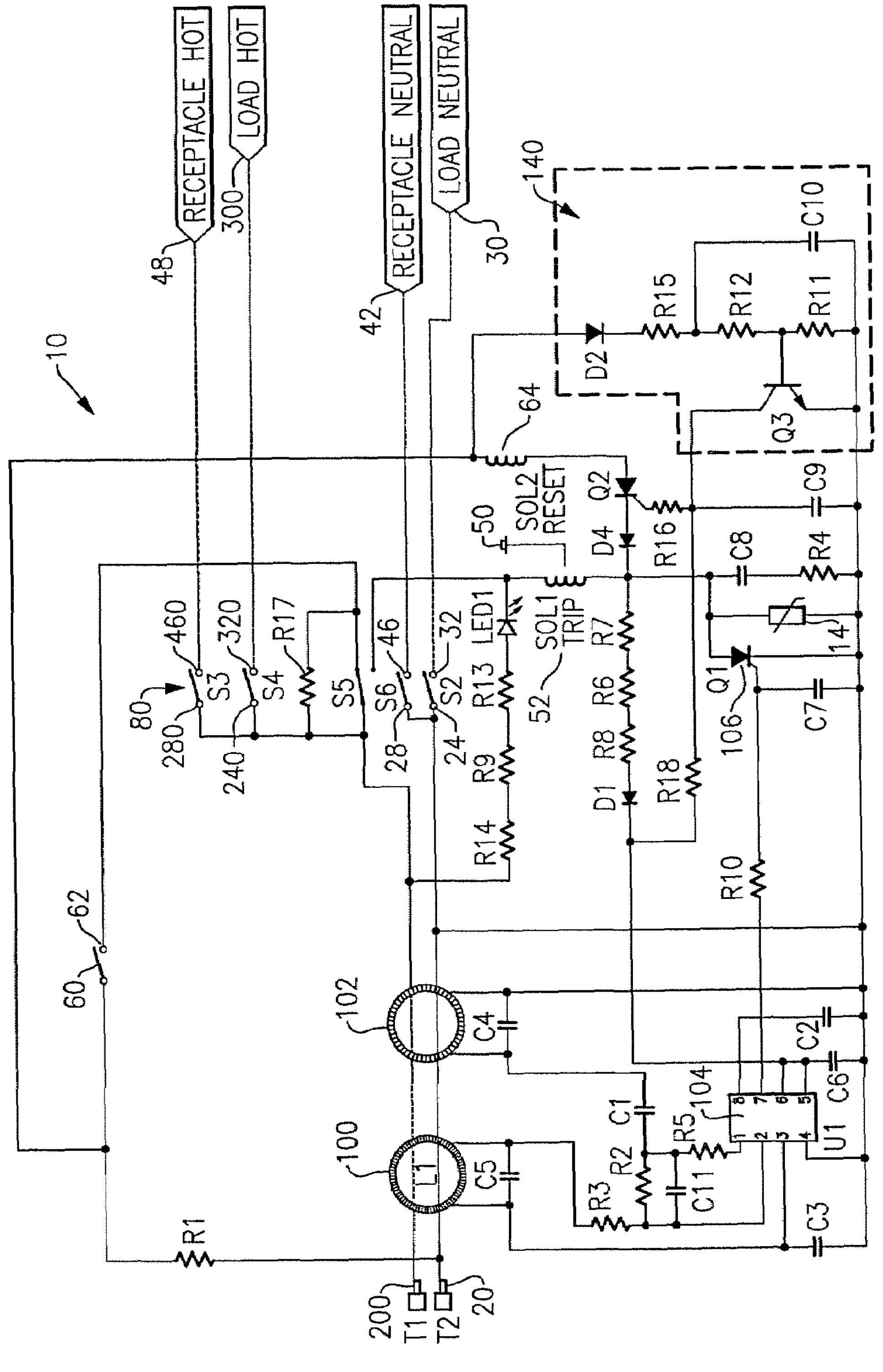
FIG. 5 is a schematic of the electrical device depicted in FIG. 1.

Referring to FIG. 5, a schematic of the electrical device 10 shown in FIGS. 1–4 is disclosed. When reset button 60 is depressed, contacts 62 are closed and a test signal is generated. If the circuit is operational, sensor 100 and detector 104 will sense and detect a differential current. A signal is provided to silicon controlled rectifier 106 and reset solenoid 64 is activated. As shown in FIGS. 1–4, reset solenoid 64 toggles latch 80 causing wiper arm 82 to separate from cantilevers 22, 26, 220, and 260. Cantilevers 22, 26, 220, and 260 are spring-loaded and biased in an upward direction. Accordingly, the cantilevers close the contacts and provide power to the receptacles 40 and load terminals (30,300.)

Subsequently, if the protection circuit senses and detects a fault condition, trip solenoid 52 is activated causing latch 80 to toggle in the other direction. Wiper arm 82 overcomes the spring loaded bias of the cantilevered arm and drives the cantilevers downward to thereby open the contacts and trip the device. As a result, power is removed from receptacles 40 and load terminals 30 and 300.

Figure 6:
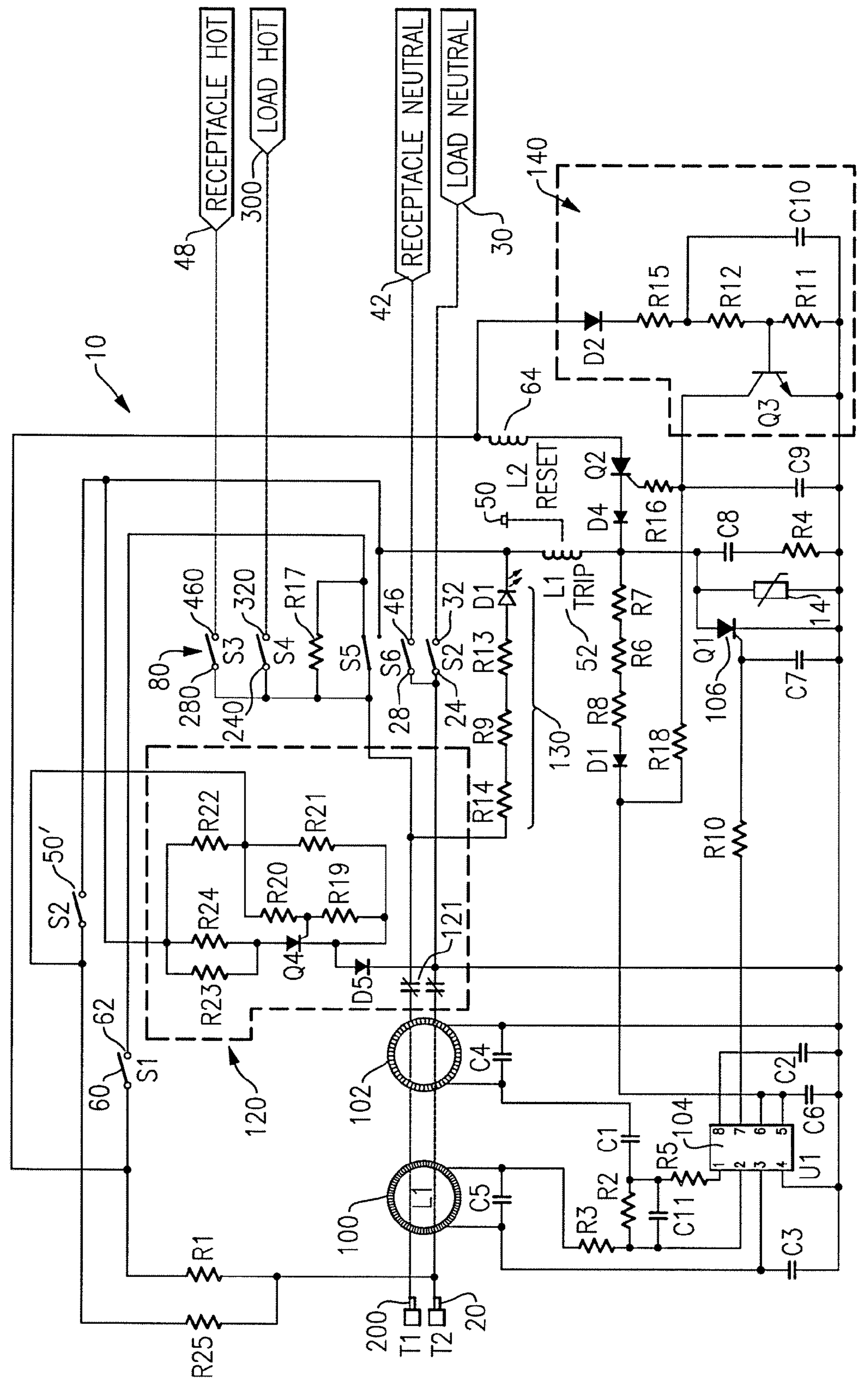
FIG. 6 is a schematic of the electrical device in accordance with an alternate embodiment of the present invention.

Referring to FIG. 6, a schematic of the electrical device in accordance with an alternate embodiment of the present invention is shown. The embodiment shown in FIG. 6 is similar to the embodiment of FIG. 5. However, the mechanical test button 50 and the trip actuator 52 shown in FIG. 5 are replaced by an electronic test button 50' in the embodiment shown in FIG. 6. The electronic test button causes a simulated test fault to be generated Trip solenoid 52 is activated when sensor 100 and detector 104 detect a fault condition. The contacts pairs 24 and 32, 28 and 46, 480 and 460, and 240 and 320 electrically decouple in response thereto, disconnecting the line, load, and receptacle contacts. TEST button switch 50' is accessible to the user and introduces a simulated ground fault, providing a convenient method for the user to periodically test the GFCI operation.

Device 10 may include a trip indicator. When device 10 is tripped, trip indicator 130 is activated. Trip indicator 130 includes components R9, R13, R14, and D1 (LED) which are connected in parallel with switch S7. When device 10 is tripped, LED D1 is illuminated. However, when the contacts are reset, there is no potential difference to cause illumination of LED and D1. Those of ordinary skill in the art will recognize that indicator 130 may include an audible annunciator as well as an illumination device.

After device 10 is tripped, the user typically depresses reset switch 60 to reset the device. Switch S7 is disposed in a position to supply power to the reset solenoid 64 via switch 60, 62. Once reset button 60 is depressed, a simulated fault is introduced through R1. The GFCI power supply (located at the anode of D1) supplies current to charge capacitor C9. When the detector 104 responds to the simulated fault, SCR Q1 is turned on. When SCR Q1 is turned on, the charge stored in C9 will discharge through the R16 and SCR Q2. As a result of the discharge current, SCR Q2 is turned on, current flows through reset solenoid 64, and the device 10 is reset.

Device 10 includes a timing circuit that is configured to limit the time that the reset solenoid is ON, irrespective of the duration that the reset button is depressed by the user.

Momentary activation of the reset solenoid avoids thermal damage to the reset solenoid due to over-activation. This feature also avoids the possibility of the reset solenoid interfering with circuit interruption when the trip solenoid is activated.

Timing circuit 140 includes: diode D2; resistors R15, R12, and R11; capacitor C10; and transistor Q3. When the reset button 60 is depressed, C10 begins charging through D2 and R15 while the simulated fault signal through R1 is being introduced. C10 is charged to a voltage that turns transistor Q3 ON after a predetermined interval, typically one and a half line cycles (25 milliseconds). Transistor Q3 discharges capacitor C9, causing Q2 to turn off. Thus, reset solenoid 64 is activated when reset button 60 is pressed and causes SCRs Q1 and Q2 to turn on, and deactivates when transistor Q3 turns on and causes SCR Q2 to turn off. Reset solenoid 64 can be reactivated for another momentary interval if the reset button 60 is released by the user for a pre-determined duration that allows C4 to discharge to a voltage where Q3 turns off. Alternatively, a timer can establish momentary reset solenoid actuation by controlling the duration of the simulated test signal or the closure interval of contact 62. Alternatively, the timer can employ mechanical and/or electrical timing methods.

Referring to FIG. 6, if device 10 has an internal fault condition that prevents SCR Q1 from turning on, device 10 has reached an end-of-life condition. The end-of-life circuit 120 is configured to detect an internal fault condition. When the internal fault is detected, reset solenoid 64 cannot be activated, and device 10 cannot be reset to provide power to the user receptacle terminals or the load terminals. As a result of the detection, the end-of-life circuit removes power from the user receptacles and the load terminals. Removal of power by the end-of-life circuit does not rely on the reset mechanism, the reset solenoid, or the circuit interrupter.

End-of-life (EOL) circuit 120 includes resistors R19–R25, SCR Q4, and diode D5. Resistor R23 is configured to heat to a temperature greater than a pre-established threshold when device 10 has an internal fault. When the temperature of resistor R23 is greater than the threshold, the line terminals decouple from the load terminals, independent of the four-pole interrupter contacts previously described. Alternatively, a resistor can be dedicated to each terminal. The resistors are heated independently to decouple the load terminals from the line terminals.

EOL circuit 120 operates as follows. With device 10 reset, the user pushes the TEST button 50', and a simulated fault is introduced through R25. Accordingly, 120V AC power is applied to EOL circuit 120. If the GFCI is operating properly, sensor 100, detector 104, and other GFCI circuitry will respond to the simulated fault and trip switches S3–S7 (contact pairs 24,32; 28,46; 240,320; 280,460) within a predetermined time (typically 25 milliseconds for GFCIs.) The circuit is designed such that the simulated fault current flowing through R25 is terminated while TEST button 50' is continuously being pushed. As such, power is removed from EOL circuit 120 before resistors R23 and/or R24 reach the temperature threshold.

Resistors R20–R22 and SCR Q1 form a latch circuit. When device 10 is not operating properly. The uninterrupted current through R21 will cause the resistance value of R21 to increase significantly. When resistor R21 changes value, the voltage divider formed by R21 and R22 is likewise changed. The voltage across R20 and R19 becomes sufficient to turn on Q4 and current begins to flow through resistors R23 and R24. In a short period of time, R23 and R24 begin to overheat and the solder securing R23 and R24 to printed circuit board 12 fails. After the solder melts, resistors R23 and R24 are displaced, actuating a mechanical disconnect mechanism 121. Alternatively, the response time of R23, R24 can be designed such that the solder is melted within the time test button 50 is depressed, in which case, the latch circuit can be omitted. R23 and R24 are directly coupled to the test circuit in this embodiment.

Figure 7:
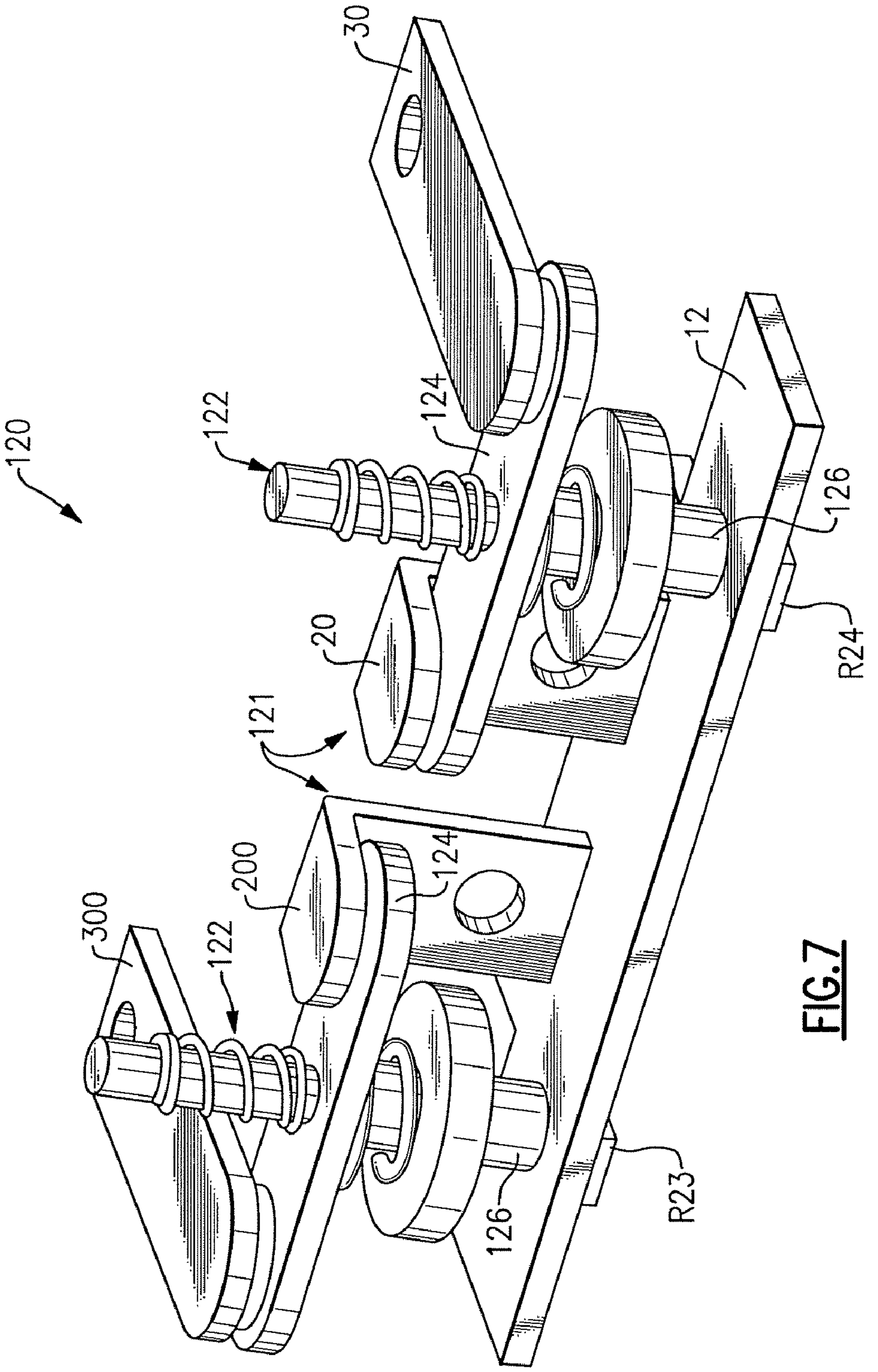
FIG. 7 is a perspective view of the end-of-life mechanism shown in FIG. 6.

FIG. 7 is a perspective view of the EOL mechanism 120 shown in FIG. 6. Resistors R23 and R24 are soldered to the underside of printed circuit board (PCB) 12. Openings are disposed in PCB 12 in alignment with resistors R23 and R24. Resistors R23 and R24 prevent spring loaded plungers 122 from extending through the openings 126 in board 12. Each plunger 122 is configured to support an electrically connecting bus-bar member 124. Each bus-bar 124 couples a line terminal (20, 200) to a load terminal (30, 300). As described above, when the solder supporting R23 and R24 melts, spring loaded plungers 122 are driven through the holes, breaking the connections between the line and load terminals. Once this occurs, there is no mechanism for resetting the device. Accordingly, the device must be replaced.

Figure 8:
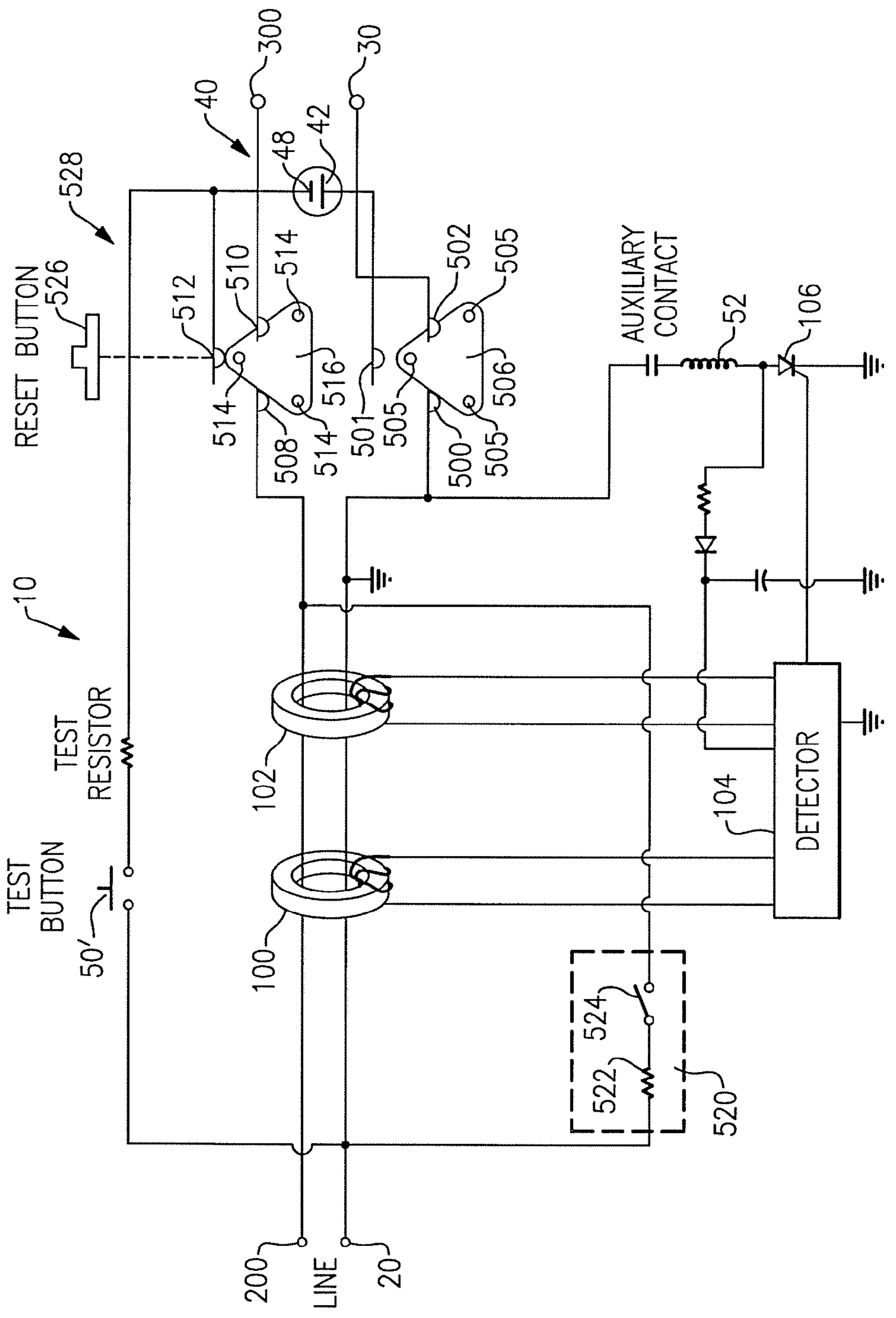
FIG. 8 is a block diagram of an electrical wiring device in accordance with a second embodiment of the present invention.

As embodied herein and depicted in FIG. 8, a block diagram of an electrical wiring device 10 in accordance with a second embodiment of the present invention is disclosed. Wiring device 10 is depicted as a GFCI. However, those skilled in the art will recognize that device 10 may be configured as an AFCI or another protective device. In this embodiment, a tri-contact design is employed. This design is also a four-pole design that is configured to deny power to the receptacles when the device is miswired and in a tripped state. Line neutral 20 is coupled to fixed neutral contact 500. Receptacle neutral contact 42 is coupled to fixed neutral contact 501. Neutral feed through terminal 30 is coupled to fixed load neutral contact 502. Each of the fixed contacts 500, 501 and 502 is paired with a moveable contact 505 disposed on tri-contact mechanism 506. On the "hot side," each of the fixed contacts 508, 510 and 512 is paired with a moveable contact 514 disposed on tri-contact mechanism 516. The wiring device tripping mechanism includes ground fault sensor 100 and grounded neutral sensor 102 coupled to detector 104. Detector 104 is coupled to silicon controlled rectifier (SCR) 106. SCR 106 is turned on in response to a detection signal from detector 104. SCR 106, in turn, signals trip solenoid 52 to move tri-contact mechanism 506 and tri-contact mechanism 516 away from the fixed contacts to thereby trip device 10.

The schematic shown in FIG. 8 may incorporate features disclosed in U.S. Pat. No. 6,522,510 which is incorporated herein by reference in its entirety. Miswire circuit 520, shown in dashed lines, is included. Circuit 520 includes a miswire resistor 522 in series with a switch 524. Switch 524 is open during manufacturing assembly to facilitate electrical testing of device 10. After device 10 has been tested, switch 524 is closed. When device 10 is properly wired, i.e., the source of power of the electrical distribution system is connected to line terminals 20 and 200, a constant current flows through resistor 522. Resistor 522 is configured to open circuit when the electrical current has flowed for a predetermined time. The predetermined time is about 1 to 5 seconds. After resistor 522 has open-circuited, reset button 526 may be depressed, enabling trip mechanism 528 to enter the reset state. Optionally, a fuse or an air gap device (not shown) may be connected in series with resistor 522. In this embodiment, resistor 522 remains closed and the fuse, or air gap device, is responsible for open-circuiting within the predetermined time.

If device 10 is miswired, the constant flow of current through resistor 522 is not present for a sufficient amount of time, and resistor 522 fails to open-circuit. However, the current that does flow through resistor 522 is sensed by differential transformer 100 as a differential current and detected by detector 104. Detector 104 signals SCR 106 to turn ON to thereby actuate solenoid 52. In turn, solenoid 52 is energized, tripping the mechanism 528. Accordingly, the current flowing through resistor 522 is interrupted before it fails. The duration of the interrupted current flow through resistor 522 is approximately the response time of device 10, e.g., less than 0.1 seconds. The duration of the current flow is too brief to cause opening of resistor 522. If reset button 526 is depressed to reset trip mechanism 528, current starts to flow again through resistor 522, however, the current is detected and mechanism 528 is immediately tripped again before resistor 522 is opened. In this manner, trip mechanism 528 does not remain in the reset state when the source of power of the power distribution system is miswired to the load terminals. Thus power is removed automatically from the receptacle terminals when the power source has been miswired to the load terminals.

Figure 9:
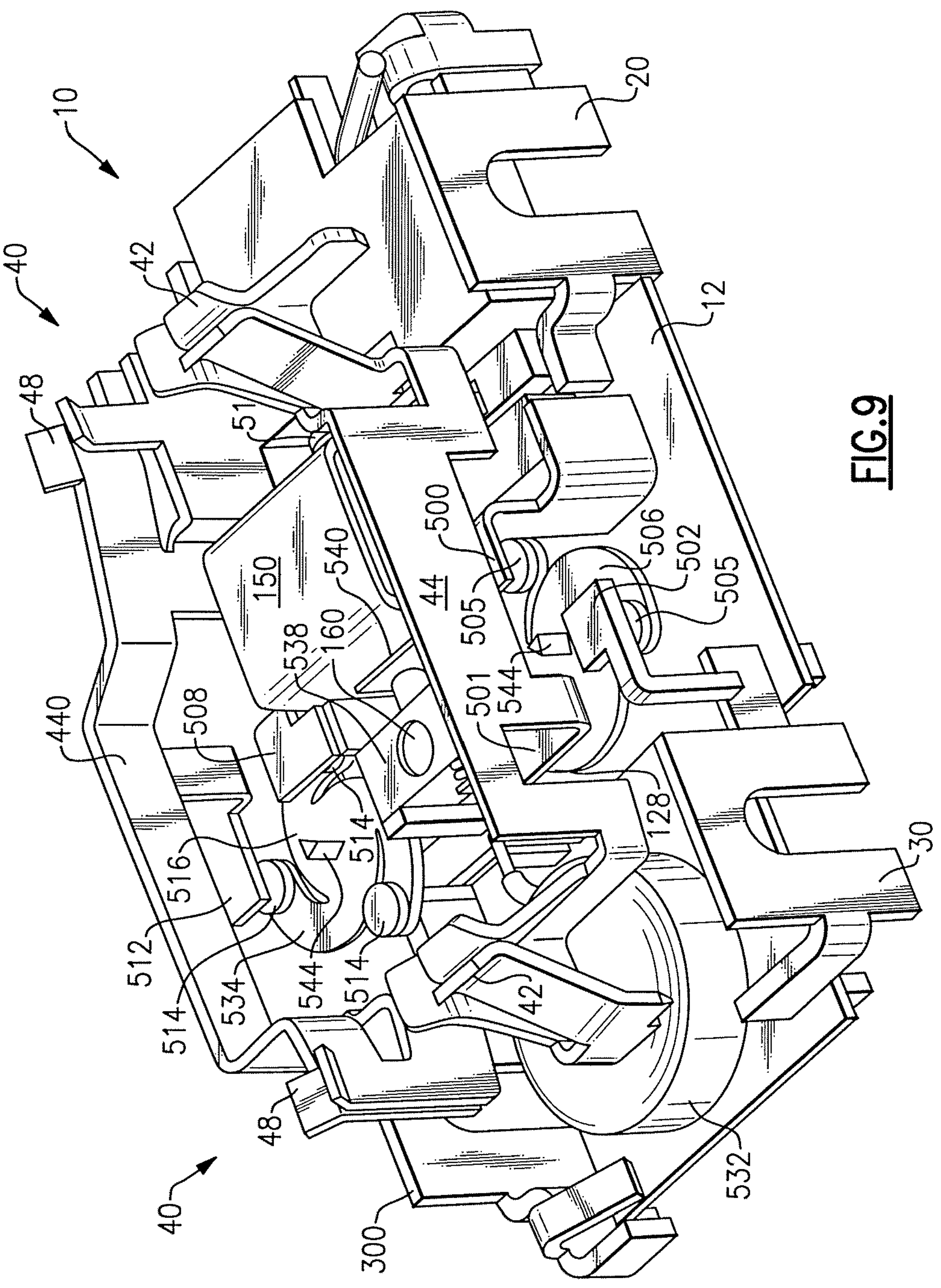
FIG. 9 is a perspective view of the electrical wiring device shown in FIG. 8.

Referring to FIG. 9, a perspective view of the electrical wiring device shown in FIG. 8 is disclosed. Protective device 10 includes a circuit board 12 which is mounted on member 118. Movistor 532, similar to movistor 14, is mounted on circuit board 12. Circuit board 12 may include either one of the protective circuits shown in FIG. 5 or FIG. 6. Device 10 is configured to be coupled to AC electrical power by way of line neutral terminal 20 and line hot terminal 200 (not shown in FIG. 9). Power is provided to a load via load neutral terminal 30 and load hot terminal 300. Device 10 also provides power to user plug contacts by way of receptacles 40. Receptacles 40 include receptacle neutral contacts 42, hot contacts 48, and ground contacts 74 (not shown.) Wiring device 10 includes four-pole functionality by virtue of tri-contact mechanisms 506, 516.

Both neutral contact mechanism 506 and hot contact mechanism 516 are configured to be moved upward and downward with respect to the fixed contacts 500, 501, 502, 508, 510 and 512 Neutral contacts 505, are disposed on curvilinear arms 534. As shown, one contact 505 corresponds to line contact 500, another to load contact 502, and yet another to fixed neutral contact 501. Referring to hot contact mechanism 516, contacts 514 are disposed on arms 536. Load hot contact 510 is not shown in FIG. 9 for clarity of illustration. However, tri-contact 516 includes three contacts 514, one contact corresponding to hot line contact 508, another to hot load contact 510, and yet another contact to hot fixed contact 512.

Figure 10:
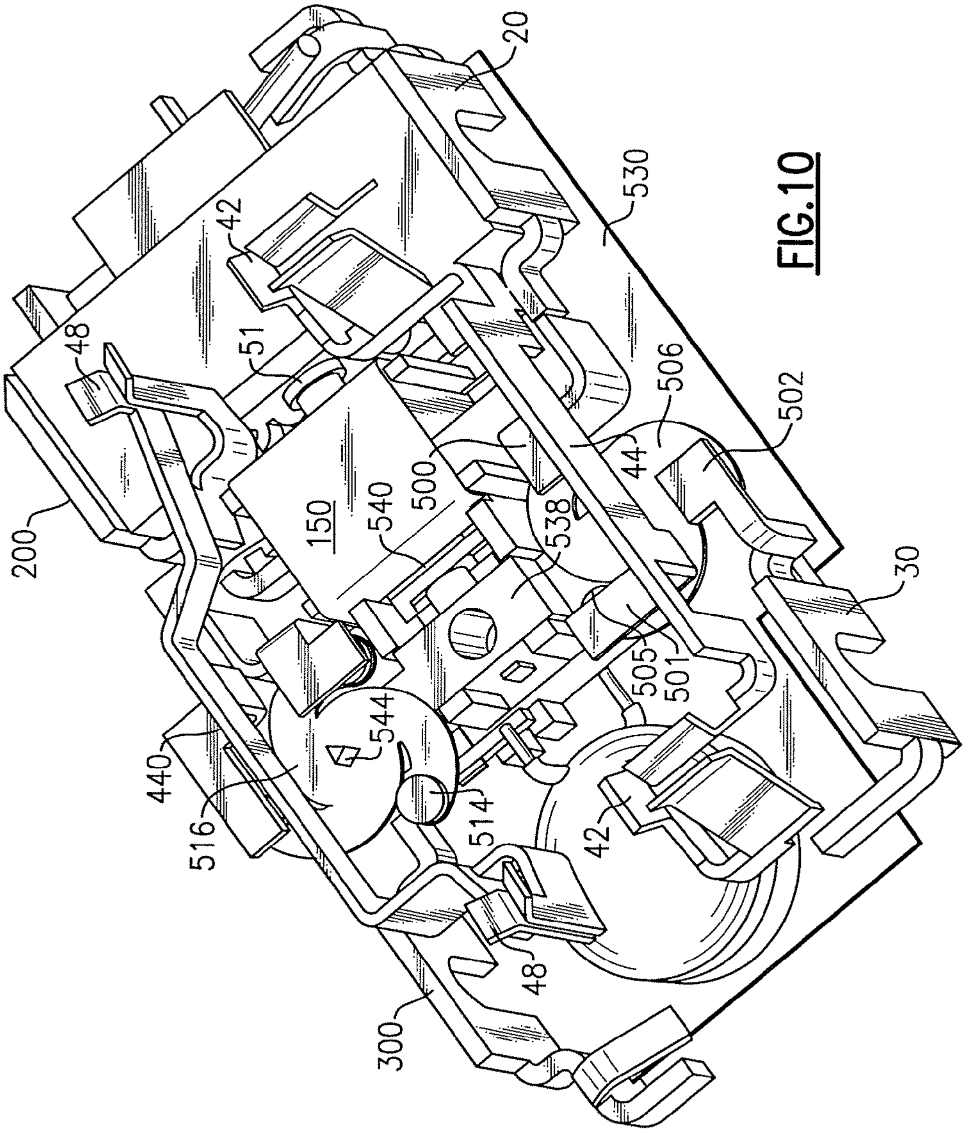
FIG. 10 is a plan view of the device shown in FIG. 8.

Referring to FIG. 10, contact mechanisms 506 and 516 are coupled to latch block 538. Latch block 538 is coupled to latch mechanism 540. Latch mechanism 540 is actuated by solenoid 52 (not shown) disposed in housing 150. Solenoid 52 is also coupled to armature 51. When the solenoid 52 is energized, armature 51 moves toward latch block 538, and latch mechanism 540 is directed with respect to latch block 538 to move latch block 538 in a downward direction, breaking the electrical connections between moveable contacts 505(514) against fixed contacts 500, 501, 502 (508, 510, 512). Latch block 538 includes a cylindrical hole that is configured to accommodate a reset pin (not shown). Reference is made to U.S. Pat. No. 6,621,388, U.S. application Ser. No. 10/729,392, and U.S. application Ser. No. 10/729,396 which are incorporated herein by reference as though fully set forth in its entirety, for a more detailed explanation of the reset mechanism.

Figure 11:
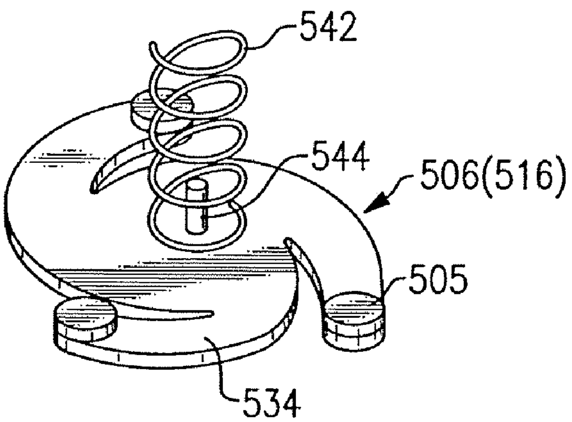
FIG. 11 is a detail view of the device shown in FIG. 8.
Figure 12:
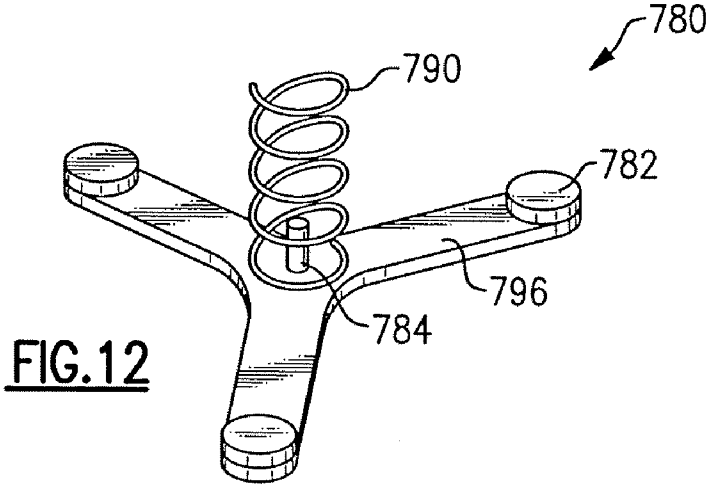
FIG. 12 is An alternate detail view of the device shown in FIG. 8.

Referring to FIG. 11, a detail view of the contact mechanism 506 shown in FIG. 9 and FIG. 10 is disclosed. As noted above, contact mechanism 506 includes contacts 505 disposed on curvilinear arms 534. Break spring 542 is disposed between contact mechanism 506 and cover (not shown). Axial member 544 may be provided to orient contact mechanism 506 with respect to latch block 538, or break spring 542 with respect to contact mechanism 506. When solenoid 52 is energized, break spring 542 forces contact mechanism 506 downward to break the contacts. It will be apparent to those of ordinary skill in the pertinent art that modifications and variations can be made to the shape of flexible contact mechanisms 506, 516 of the present invention. For example, the shape of the contact mechanism 506, 516 may be circular, triangular, Y-shaped, or any suitable shape that promotes secure contact during normal operating conditions. For example, FIG. 12 shows a Y-shaped contact mechanism 780. In this embodiment, mechanism includes contacts 782 disposed on arms 796. As in FIG. 6, break spring 790 is disposed between contact mechanism 780 and cover (not shown). When solenoid 52 is energized, break spring 790 forces contact mechanism downward to break the contacts.

Figure 13:
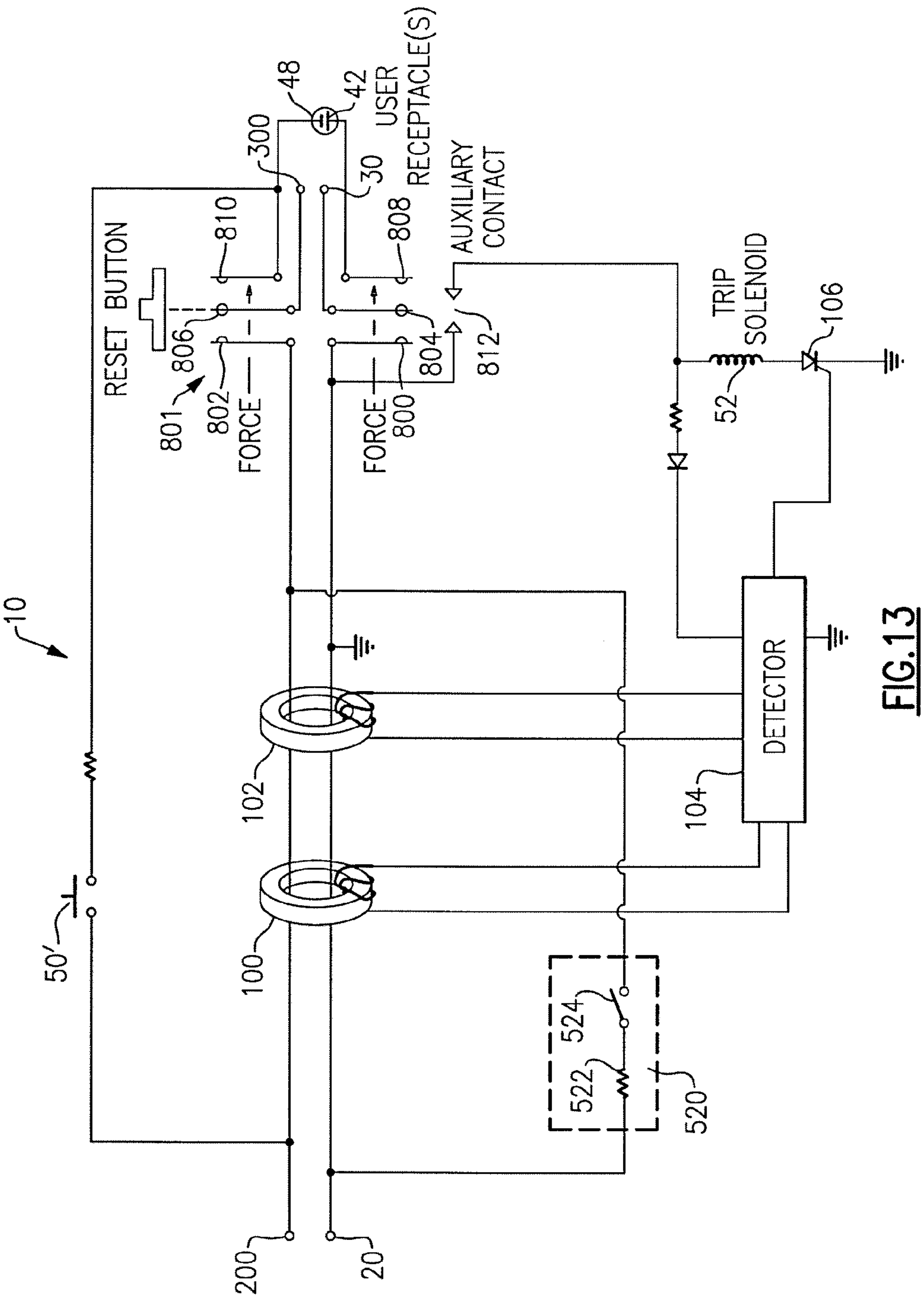
FIG. 13 is a block diagram of an electrical wiring device in accordance with a third embodiment of the present invention.

As embodied herein, and depicted in FIG. 13, a block diagram of an electrical wiring device in accordance with another embodiment of the present invention is disclosed. While device 10 is depicted as a GFCI, those skilled in the art will recognize that device 10 may include an AFCI or other such protective device. This design is referred to as a sandwiched cantilever design. This embodiment also may include either one of the protective circuits shown in FIG. 5 or FIG. 6. This embodiment is also a four-pole design that is configured to deny power to the receptacles when the device is miswired and in a tripped state. Line neutral terminal 20 is coupled moveable neutral contact 800. Receptacle neutral contact 42 is coupled to fixed neutral contact 808. Neutral load terminal 30 is coupled to moveable load neutral contact 804. Moveable load contact 804 is disposed between contact 800 and contact 808. When device 10 is reset, contacts 800, 804, and 808 are sandwiched together. The "hot side" includes analogous contacts 802, 806, and 810. The tripping mechanism includes ground fault sensor 100 and grounded neutral sensor 102 coupled to detector 104. Detector 104 is coupled to silicon controlled rectifier (SCR) 106. SCR 106 is turned on in response to a detection signal from detector 104. SCR 106, in turn, signals trip solenoid 52 to release the sandwiched cantilevers.

Figure 14:
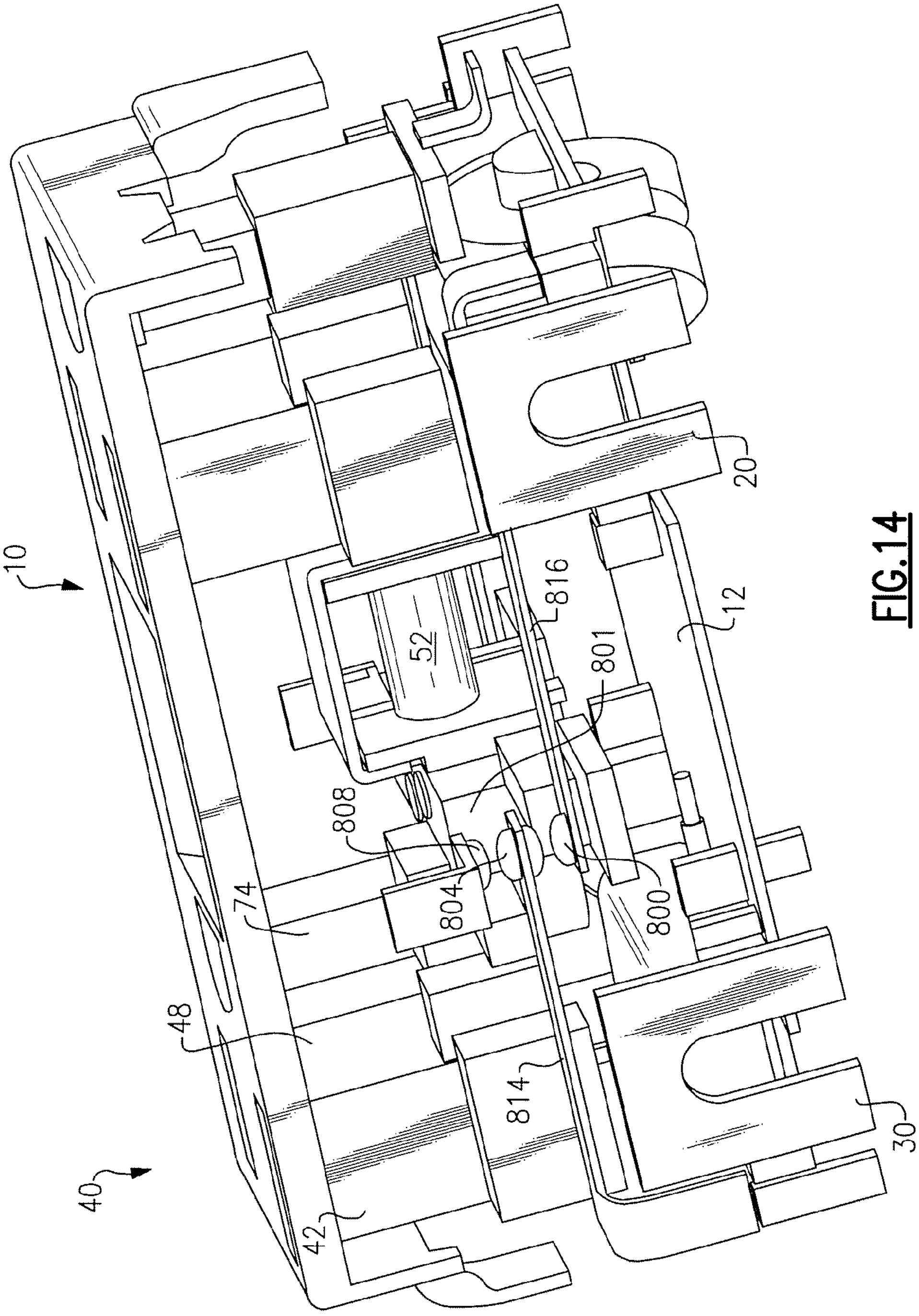
FIG. 14 is a perspective view of an electrical wiring device depicted in FIG. 13.

Referring to FIG. 14, a perspective view of an electrical wiring device depicted in FIG. 13 is disclosed. Device 10 is configured to be coupled to AC electrical power by way of line neutral terminal 20 and line hot terminal 200 (not shown in FIG. 14). Power is provided to a load via load neutral terminal 30 and load hot terminal 300 (not shown in FIG. 14). Device 10 also provides power to user plug contacts by way of receptacles 40. Receptacles 40 include receptacle neutral contacts 42, receptacle hot contacts 48, and may include receptacle ground contact 74.

Contact 808 is a fixed contact. Neutral load contact 804 is a two-way contact that is disposed on flexible member 814, which is connected to load terminal 30. Line neutral contact 800 is connected to flexible member 816. Flexible member 816 is connected to neutral line terminal 20. When solenoid 52 is energized, latch mechanism 801 releases contacts 800, 804, and 808 and device 10 is tripped. Latch mechanism 801 includes a cylindrical hole that is configured to accommodate a reset pin (not shown). Reference is made to U.S. Pat. No. 6,621,388, U.S. application Ser. No. 10/729,392, and U.S. application Ser. No. 10/729,396 which are incorporated herein by reference as though fully set forth in its entirety, for a more detailed explanation of the reset mechanism.

Figure 15:
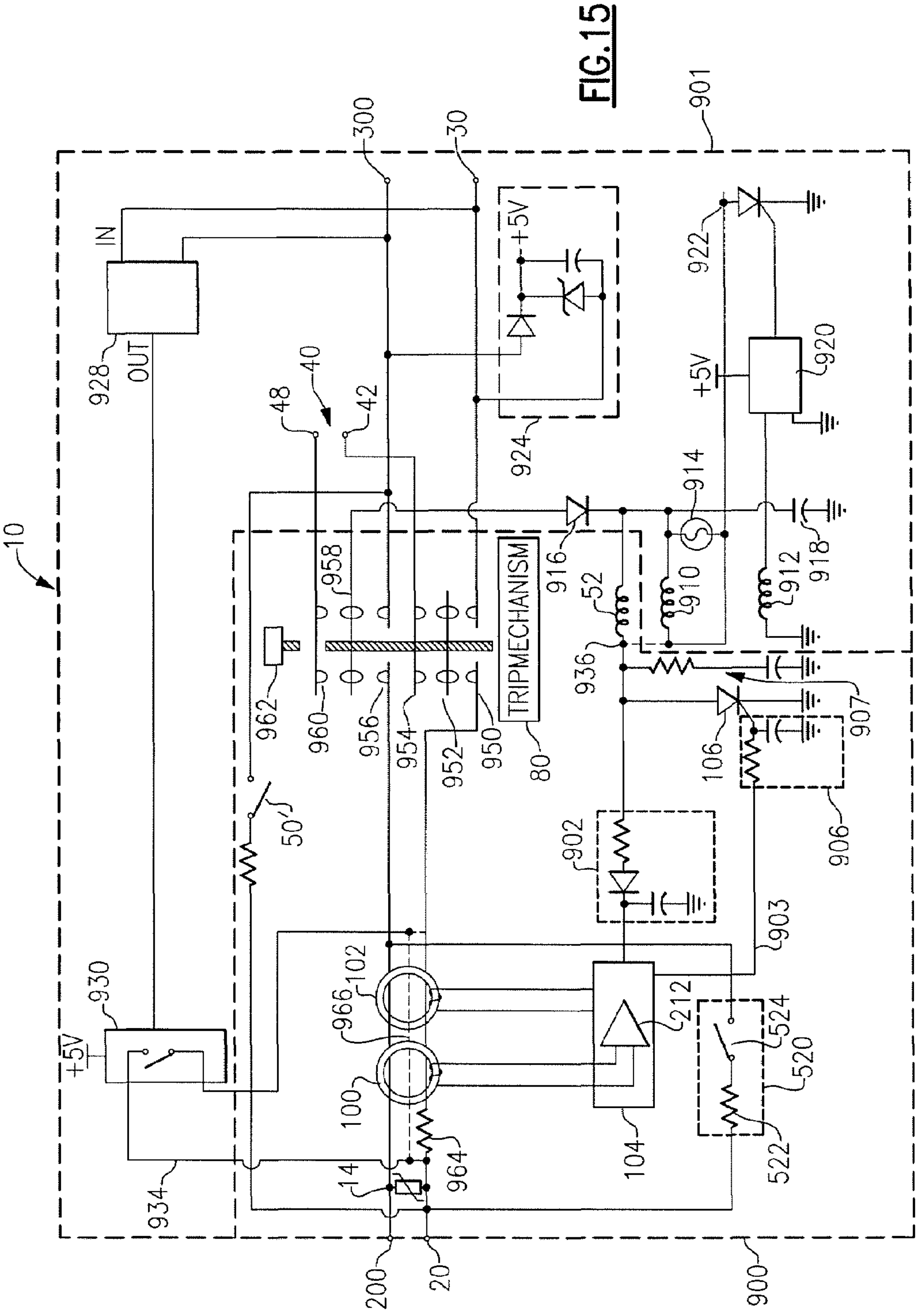
FIG. 15 is a schematic of the electrical device depicted in FIG. 13.

As embodied herein and depicted in FIG. 15, a schematic of the electrical device depicted in FIG. 13 is disclosed. The circuit depicted in FIG. 15 may also be employed in the embodiments shown in FIGS. 1–4, and 8–12. The circuit is configured to introduce a simulated ground fault every period during the negative half cycle of the AC power source that the trip SCR 24 cannot conduct. If the device fails to detect the simulated ground fault, i.e., there is an internal fault condition, the device denies power to the load terminals and the receptacle(s) on the next positive half cycle. The schematic depicts a GFCI circuit for purposes of illustration, but applies to other protective devices by providing a simulated fault condition(s) during negative half cycles appropriate to the device. Device 10 protects an electrical circuit connected to load terminals 30 (300), and receptacle(s) 40. Device 10 is connected to the AC power source by way of line-side neutral terminal 20 and line-side hot terminal 300. Device 10 includes two main parts, Ground Fault Interrupt (GFI) circuit 900 and checking circuit 901.

GFI circuit 900 includes a differential sensor 100 that is configured to sense a load-side ground fault when there is a difference in current between the hot and neutral conductors. Differential sensor 100 is connected to detector circuit 104, which processes the output of differential sensor 100. Detector 104 is connected to power supply circuit 902. Power supply 902 provides power to detector 104. Detector 104 is configured to detect a ground fault during both the positive half-cycle and the negative half cycle of the AC power. As such, detector circuit 104 provides an output signal on output line 903. The output line 903 is coupled to SCR 106 by way of filter circuit 904. When detector circuit 104 senses a fault, the voltage signal on output line 903 changes and SCR 106 is turned on. SCR 106 is only able to turn on during the positive half cycles of the AC power source. Further, snubber network 907 prevents SCR 106 from turning on due to spurious transient noise in the electrical circuit. When SCR 106 is turned on, solenoid 52 is activated. Solenoid 52, in turn, causes the trip mechanism 80 (528, 801) to release the four pole interrupter contacts, i.e. contacts 950, 952, 954, and contacts 956, 958, 960. When the interrupter contacts are released, the load-side of device 10 and the receptacle 40 are independently decoupled from the line-side power source of the electrical circuit.

GFI circuit 900 also includes a grounded neutral transmitter 102 that is configured to detect grounded neutral conditions. Those skilled in the art understand that the conductor connected to neutral line terminal 20 is deliberately grounded in the electrical circuit. A grounded neutral condition occurs when a conductor connected to load neutral terminal 200 is accidentally grounded. The grounded neutral condition creates a parallel conductive path with the return path disposed between load terminal 200(42) and line terminal 20. When a grounded neutral condition is not present, grounded neutral transmitter 102 is configured to couple equal signals into the hot and neutral conductors. As noted above, differential sensor 100 senses a current differential. Thus, the equal signals provided by grounded neutral transmitter 102 are ignored. However, when a grounded neutral condition is present, the signal coupled onto the neutral conductor circulates as a current around the parallel conductive path and the return path, forming a conductive loop. Since the circulating current conducts through the neutral conductor but not the hot conductor, a differential current is generated. Differential sensor 100 detects the differential current between the hot and neutral conductors. As such, detector 104 produces a signal on output 903 in response to the grounded neutral condition.

As noted initially, Device 10 includes a checking circuit 901. Checking circuit 901 causes GFI 900 to trip due an internal fault also known as an end of life condition. Examples of an end of life condition include, but are not limited to, a non-functional sensor 100, grounded neutral transmitter 102, ground fault detector 104, filtering circuit 906, SCR 106, snubber 907, solenoid 52, or power supply 902. An internal fault condition may include a shorting or opening of an electrical component, or an opening or shorting of electrical traces configured to electrically interconnect the components, or other such fault conditions wherein GFI 900 does not trip when a grounded neutral fault occurs.

Checking circuit 900 includes several functional groups. The components of each group are in parenthesis. These functions include a fault simulation function (928, 930, 934), a power supply function 924, a test signal function (52, 916, 918, 912), a failure detection function (920), and failure response function (922, 910, 914).

Fault simulation is provided by polarity detector 928, switch 930, and test loop 934. Polarity detector 928 is configured to detect the polarity of the AC power source, and provide an output signal that closes switch 930 during the negative half cycle portions of the AC power source, when SCR 106 cannot turn on. Test loop 934 is coupled to grounded neutral transmitter 102 and ground fault detector 100 when switch 930 is closed. Loop 934 has less than 2 Ohms of resistance. Because polarity detector 928 is only closed during the negative half cycle, electrical loop 934 provides a simulated grounded neutral condition only during the negative half cycle. However, the simulated grounded neutral condition causes detector 104 to generate a fault detect output signal on line 903.

The test signal function provides an oscillating ringing signal that is generated when there is no internal fault condition. Capacitor 918 and solenoid 52 form a resonant circuit. Capacitor 918 is charged through a diode 916 connected to the AC power source of the electrical circuit. SCR 106 turns on momentarily to discharge capacitor 918 in series with solenoid 52. Since the discharge event is during the negative half cycle, SCR 106 immediately turns off after capacitor 918 has been discharged. The magnitude of the discharge current and the duration of the discharge event are insufficient for actuating trip mechanism 80 (528, 801), and thus, the interrupting contacts remain closed. When SCR 106 discharges capacitor 918 during the negative AC power cycle, a field is built up around solenoid 52 which, when collapsing, causes a recharge of capacitor 918 in the opposite direction, thereby producing a negative voltage across the capacitor when referenced to circuit common. The transfer of energy between the solenoid 52 and capacitor 918 produces a test acceptance signal as ringing oscillation. Winding 912 is magnetically coupled to solenoid 52 and serves as an isolation transformer. The test acceptance signal is magnetically coupled to winding 912 and is provided to reset delay timer 920.

The failure detection function is provided by delay timer 920 and SCR 922. Delay timer 920 receives power from power supply 924. When no fault condition is present, delay timer 920 is reset by the test acceptance signal during each negative half cycle preventing timer 920 from timing out. If there is an internal fault in GFI 900, as previously described, the output signal on line 903 and associated test acceptance signal from winding 912 which normally recurs on each negative half cycle ceases, allowing delay timer 920 to time out.

SCR 922 is turned on in response to a time out condition. SCR 922 activates solenoid 910 which in turn operates the trip mechanism 80 (528, 801.) Subsequently, the four-pole interrupter contacts are released and the load-side terminals (30, 300) and receptacle(s) 40 are decoupled from the power source of the electrical circuit. If a user attempts to reset the interrupting contacts by manually depressing the reset button 962, the absence of test acceptance signal causes device 10 to trip out again. The internal fault condition can cause device 10 to trip, and can also be indicated visually or audibly using indicator 914. Alternatively, solenoid 910 may be omitted, such that the internal fault condition is indicated visually or audibly using indicator 914, but does not cause device 10 to trip. Thus the response mechanism may be a circuit interruption by mechanism 80 (528, 801), an indication by indicator 914 or both in combination with each other.

Checking circuit 901 is also susceptible to end of life failure conditions. Checking circuit 901 is configured such that those conditions either result in tripping of GFI 900, including each time reset button 928 is depressed, or at least such that the failure does not interfere with the continuing ability of GFI 900 to sense, detect, and interrupt a true ground fault or grounded neutral condition. For example, if SCR 922 develops a short circuit, solenoid 910 is activated each time GFI 900 is reset and GFI 900 immediately trips out. If one or more of capacitor 918, solenoid 910 or winding 912 malfunction, an acceptable test signal will not generated, and checking circuit 901 is configured to cause GFI 900 to trip out. If polarity detector 928 or switch 930 are shorted out, the grounded neutral simulation signal is enabled during both polarities of the AC power source. This will cause GFI 900 to trip out. If polarity detector 928 or switch 930 open circuit, there is absence of grounded neutral simulation signal, and delay timer 920 will not be reset and GFI 900 will trip out. Solenoids 52 and 910 are configured to operate trip mechanism 80 (528, 801) even if one or the other has failed due to an end of life condition. Therefore if solenoid 910 shorts out, trip mechanism 80 is still actuatable by solenoid 52 during a true fault condition. If power supply 924 shorts out, power supply 902 still remains operational, such that GFI 900 remains operative.

Although to the likelihood of occurrence is low, some double fault conditions cause GFI 900 to immediately trip out. By way of illustration, if SCR 922 and SCR 106 simultaneously short out, solenoids 52 and 910 are both turned on, resulting in activation of trip mechanism 80 (528, 801.)

In another embodiment, solenoid 910 may be omitted and SCR 922 re-connected as illustrated by dotted line 936. During a true fault condition, solenoid 52 is turned on (activated) by SCR 106; when an end of life condition in GFI 900 is detected by checking circuit 901, solenoid 52 is turned on by SCR 922. The possibility of a solenoid 52 failure is substantially minimized by connecting solenoid 52 to the load side of the interrupting contacts.

As has been described, wire loop 934 includes a portion of the neutral conductor. A segment of the hot conductor can be included in electrical loop 934 instead of the neutral conductor to produce a similar simulation signal (not shown).

Other modifications may be made as well. The neutral conductor (or hot) conductor portion has a resistance 964, typically 1 to 10 milliohms, through which current through the load flows, producing a voltage drop. The voltage drop causes a current in electrical loop 934 to circulate which is sensed by differential sensor 100 as a ground fault. Consequently, ground fault detector 104 produces a signal on output 903 due to closure of test switch 930 irrespective of whether or not an internal fault condition has occurred in neutral transmitter 102. In order to assure that grounded neutral transmitter 102 is tested for a fault by checking circuit 901, electrical loop 934 can be configured as before but not to include a segment of the neutral (or hot) conductor, as illustrated by the wire segment, shown as dotted line 966.

Device 10 may also be equipped with a miswiring detection circuit 520, such as has been described. If device 10 has been correctly wired, resistor 522 fuses open. Thus, the miswire detection circuit will not be available to afford miswire protection if device 10 happens to be re-installed. However, the checking circuit 901 can be configured to provide miswiring protection to a re-installation. During the course of re-installation, the user depresses test button 50' to trip GFI 900. If device 10 has been miswired, power supply 924, connected to the load side of interrupting contacts, provides power to delay timer 920. Power supply 902 is configured to the circuit interrupting contacts, such that when GFI 900 is tripped, power supply 902 does not receive power. Since GFI 900 is not powered and thus inoperative, test acceptance signal is not communicated by winding 912. As a result, checking circuit 901 trips device 10. Whenever the reset button is depressed, the trip mechanism is activated such that the interrupter contacts do not remain closed. Thus, the checking circuit 901 interprets a re-installation miswiring in a similar manner to an end-of-life condition. Device 10 can only be reset after having been wired correctly.

Figure 16:
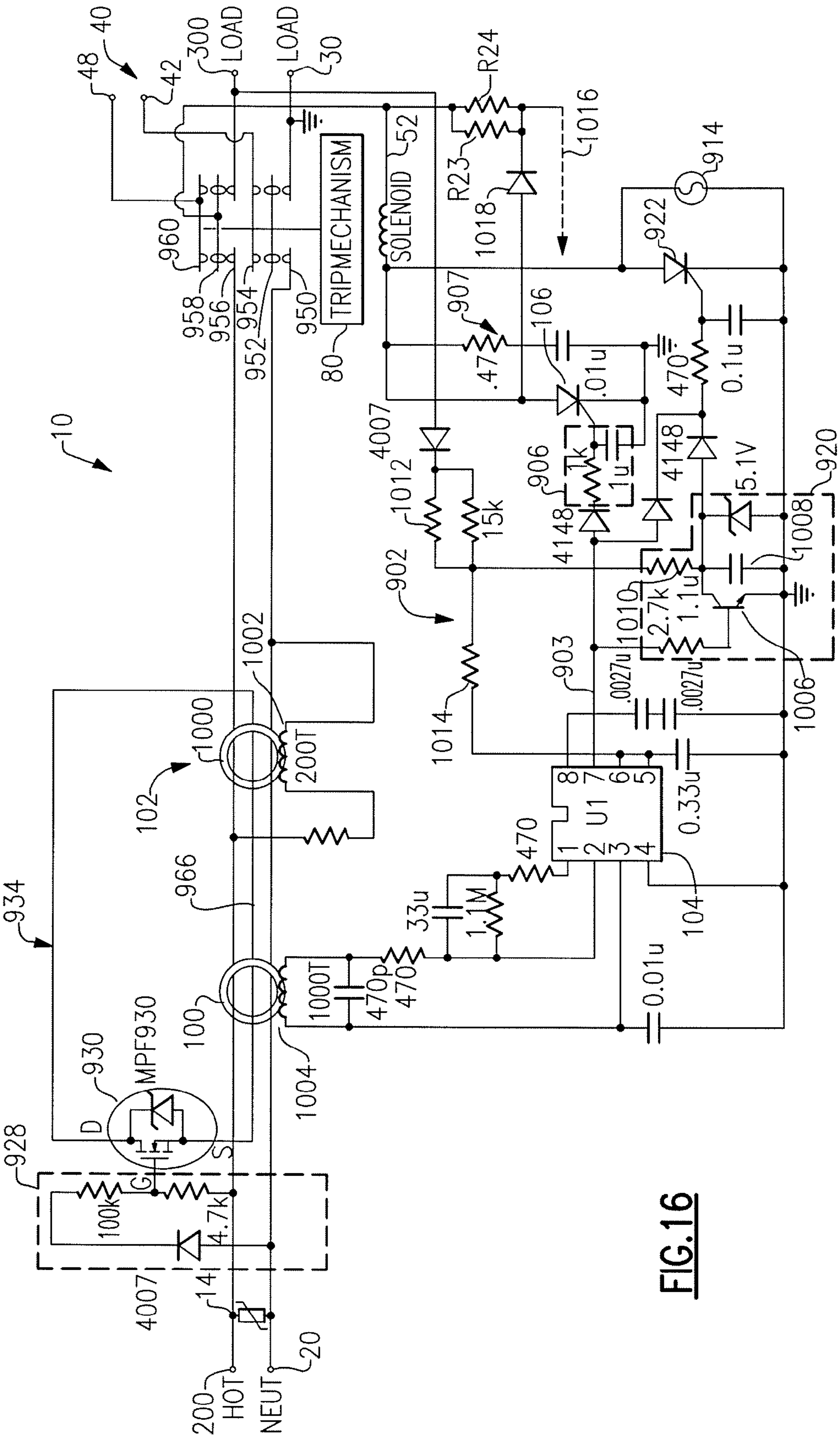
FIG. 16 is a schematic of the electrical device depicted in FIG. 13.

Referring to FIG. 16, an alternate schematic of the electrical device depicted in FIG. 13 is disclosed. This embodiment includes an auto-test circuit with an end-of-life circuit. This design may be employed in conjunction with any of the embodiments discussed above. This circuit is similar to the circuit depicted in FIG. 15, and the end-of-life circuit/mechanism is similar to that shown above. Grounded neutral transmitter 102 includes a saturating core 1000 and a winding 1002 coupled to hot and neutral line terminals 200 and 20, respectively. During a true grounded neutral fault condition, saturating core 1000 induces current spikes in the electrical loop 934. Reversals in the magnetic field in core 1000 corresponded to the zero crossings in the AC power source. The reversals in the magnetic field generate current spikes. Current spikes occurring during the positive-transitioning zero crosses produce a signal during the positive half cycle portions of the AC power source. The signal is sensed as a differential signal by ground fault sensor 100, and detected by ground fault detector 104. Subsequently, GFI 900 is tripped.

A simulated grounded neutral condition is enabled by polarity detector 928 and switch 930. Polarity detector 928 closes switch 930 during the negative half cycle. Thus, the current spikes occur during the negative half cycle portions but not during the positive half cycle portions of the AC power source. As described above, the output of detector 104 (line 903) during the negative half cycle portions of the AC power source are unable to turn on SCR 106. However, the output signal is used by checking circuit 901 to determine whether or not an end of life condition has occurred.

Switch 934 may be implemented using a MOSFET device, designated as MPF930 and manufactured by ON Semiconductor. In another embodiment, switch 934 may be monolithically integrated in the ground fault detector 104.

In response to a true ground fault or grounded neutral condition, ground fault detector 900 produces an output signal 903 during the positive half cycle portions of AC power source. The signal turns on SCR 106 and redundant SCR 922 to activate solenoid 52. Solenoid 52 causes trip mechanism 80 (528, 801) to operate.

When a simulated grounded neutral condition is introduced in the manner described above, a test acceptance signal is provided to delay timer 920 during the negative half cycle portions of the AC power source. Delay timer 920 includes a transistor 1006 that discharges capacitor 1008 when the test acceptance signal is received. Capacitor 1008 is recharged by power supply 902 by way of resistor 1010 during the remaining portion of the AC line cycle. Again, if there is an internal failure in device 10, the test acceptance signal is not generated and transistor 1006 is not turned on. As a result, capacitor 1008 continues to charge until it reaches a predetermined voltage. At the predetermined voltage SCR 922 is activated during a positive half cycle portion of the AC power source signal. In response, solenoid 52 causes the trip mechanism 80 (528,801) to operate. Alternatively, SCR 922 can be connected to a second solenoid 910 (see FIG. 15.)

Both GFI 900 and checking circuit 901 derive power from power supply 902. Redundant components can be added such that if one component has reached end of life, another component maintains the operability of GFI 900, thereby enhancing reliability, or at least assuring the continuing operation of the checking circuit 901. For example, the series pass element 1012 in power supply 902 may include parallel resistors. Resistor 1014 may be included to prevent the supply voltage from collapsing in the event the ground fault detector 104 shorts out. Clearly, if the supply voltage collapses, delay timer 920 may be prevented from signaling an end of life condition. Those of ordinary skill in the art will recognize that there are a number of redundant components that can be included in device 10, the present invention should not be construed as being limited to the foregoing example.

Alternatively, SCR 922 may be connected to end-of-life resistors R23, R24, as have been described, as shown by dotted line 1016, instead of being connected to solenoid 52 or 910. When SCR 922 conducts, the value of resistors R23, R24 is selected to generate an amount of heat in excess of the melting point of solder on its solder pads, or the melting point of a proximate adhesive. The value of resistors R23, R24 are typically 1,000 ohms. Resistors R23, R24 function as part of a thermally releasable mechanical barrier.

Since end of life resistors R23, R24 afford a permanent decoupling of the load side of device 10 from the AC power source, it is important that the end of life resistors R23, R24 only dislodge when there is a true end of life condition and not due to other circumstances, such as transient electrical noise. For example, SCR 922 may experience self turn-on in response to a transient noise event. Coupling diode 1018 may be included to decouple resistors R23, R24 in the event of a false end of life condition. Coupling diode 1018 causes SCR 922 to activate solenoid 52 when it is ON.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An electrical wiring protection device comprising:

a housing assembly including at least one receptacle, the at least one receptacle being configured to receive plug contact blades inserted therein, the housing assembly including a hot line terminal, a neutral line terminal, a hot load terminal, and a neutral load terminal;

at least one set of receptacle contacts disposed in the housing assembly and in communication with the at least one receptacle, the at least one set of receptacle contacts including a hot user-accessible load contact and a neutral user accessible load contact;

a fault detection circuit coupled to the hot line terminal and the neutral line terminal, the fault detection circuit being configured to detect at least one fault condition and provide a fault detect signal in response thereto;

a four-pole interrupting contact assembly coupled to the fault detection circuit and including, at least one solenoid coupled to the fault detection circuit, an armature coupled to the at least one solenoid, the armature being configured to move in only a first direction in response to any force generated by the at least one solenoid, and a set of four-pole interrupting contacts having a first pair of hot contacts coupling the hot line terminal and the hot load terminal, a second pair of hot contacts coupling the hot line terminal to the hot user-accessible load contact, a first pair of neutral contacts coupling the neutral line terminal and the neutral load terminal, and a second pair of neutral contacts coupling the neutral line terminal to the neutral user-accessible load contact, the set of four-pole interrupting contacts being configured to provide electrical continuity between the first pair of hot contacts, the second pair of hot contacts, the first pair of neutral contacts, and the second pair of neutral contacts in a coupled state, the set of four-pole interrupting contacts being driven by the armature movement in the first direction to thereby interrupt electrical continuity between the first pair of hot contacts, the second pair of hot contacts, the first pair of neutral contacts, and the second pair of neutral contacts in a tripped state; and a reset mechanism coupled to the four-pole interrupting contact assembly, the reset mechanism including a reset button and a reset actuator that selectively provides a reset stimulus in response to an actuation of the reset button, the first pair of hot contacts, the second pair of hot contacts, the first pair of neutral contacts, and the second pair of neutral contacts being necessarily driven into the coupled state by the reset stimulus.

2. The device of claim 1, wherein the set of four-pole interrupting contacts further comprises:

a first cantilever connected to the hot line terminal at a first end and including a first cantilever contact disposed thereon at a second end, the first cantilever contact and a hot load terminal contact forming a first contact pair of hot contacts configured to couple the hot line terminal and the hot load terminal;

a second cantilever connected to the hot line terminal at the first end and including a second cantilever contact disposed thereon at the second end, the second cantilever contact and a hot user-accessible load contact forming a second contact pair of hot contacts configured to couple the hot line terminal and the hot user-accessible load terminal;

a third cantilever connected to the neutral line terminal at a first end and including a third cantilever contact disposed thereon at the second end, the third cantilever contact and a neutral load terminal contact forming a first contact pair of neutral contacts configured to couple the neutral line terminal and the neutral load terminal; and a fourth cantilever connected to the neutral line terminal at the first end and including a fourth cantilever contact disposed thereon at the second end, the fourth cantilever contact and a neutral user-accessible load contact forming a second contact pair of neutral contacts configured to couple the neutral line terminal and the neutral user-accessible load terminal.

3. The device of claim 2, further comprising a test mechanism configured to mechanically drive the set of four-pole interrupting contacts into the tripped state, the reset mechanism being independent of the test mechanism.

4. The device of claim 3, wherein the reset button is coupled to a pair of test contacts, the reset mechanism generating a simulated fault condition in response to the pair of test contacts being closed, the fault detection circuit being configured to generate the fault detect signal in response thereto.

5. The device of claim 2, further comprising a latch mechanism coupled to the first cantilever, second cantilever, third cantilever, and the fourth cantilever, the latch mechanism being configured to open the set of four-pole interrupting contacts in response to the fault detect signal.

6. The device of claim 5, wherein the at least one solenoid includes a first solenoid configured to move the first cantilever, second cantilever, third cantilever, and the fourth cantilever in a first direction to thereby reestablish electrical continuity between the first pair of hot contacts, the second pair of hot contacts, the first pair of neutral contacts, and the second pair of neutral contacts.

7. The device of claim 6, wherein the first solenoid includes a pair of test contacts coupled to the reset mechanism, the reset mechanism generating the simulated fault condition in response to the pair of test contacts being closed.

8. The device of claim 7, wherein the reset stimulus is not provided to the first solenoid to reestablish electrical continuity between the first pair of hot contacts, the second pair of hot contacts, the first pair of neutral contacts, and the second pair of neutral contacts if the fault detection circuit fails to respond to the simulated fault condition.

9. The device of claim 5, wherein the latch mechanism includes a second solenoid coupled to a test button, the second solenoid being configured to drive the first cantilever, second cantilever, third cantilever, and the fourth cantilever in a second direction to cause electrical discontinuity between the first pair of hot contacts, the second pair of hot contacts, the first pair of neutral contacts, and the second pair of neutral contacts in response to the test button being actuated.

10. The device of claim 3, wherein the latch mechanism further comprises:

a latch toggle mechanism including a first arm and a second arm in a fixed positional relationship about an axis of rotation, the first arm being coupled to the first cantilever, second cantilever, third cantilever, and the fourth cantilever;

a first solenoid coupled to the reset mechanism and configured to apply a first force to the second arm in response to the reset stimulus to thereby move the first arm and the second arm in a first direction about the axis of rotation, the first arm driving the first cantilever, second cantilever, third cantilever, and the fourth cantilever in response thereto, whereby electrical continuity between the first pair of hot contacts, the second pair of hot contacts, the first pair of neutral contacts, and the second pair of neutral contacts is reestablished; and a second solenoid coupled to a test button and configured to apply a second force to the first arm to thereby move the first arm and the second arm in a second direction about the axis of rotation, the first arm driving the first cantilever, second cantilever, third cantilever, and the fourth cantilever in response thereto, whereby electrical continuity between the first pair of hot contacts, the second pair of hot contacts, the first pair of neutral contacts, and the second pair of neutral contacts is broken.

11. The device of claim 10, wherein the reset stimulus is not provided to the first solenoid to reestablish electrical continuity between the first pair of hot contacts, the second pair of hot contacts, the first pair of neutral contacts, and the second pair of neutral contacts if the fault detection circuit fails to respond to the simulated fault condition.

12. The device of claim 1, further comprising an end-of-life mechanism including an end-of-life circuit, a third pair of hot contacts coupling the hot line terminal and the hot load terminal, and a third pair of neutral contacts coupling the neutral line terminal and the neutral load terminal, the end-of-life circuit being configured to decouple the third pair of hot contacts and the third pair of neutral contacts if the fault detection circuit fails to provide the fault detection signal within a predetermined period of time after a simulated fault condition is generated, the end-of-life mechanism being independent of the set of four-pole interrupting contacts.

13. The device of claim 1, wherein the four-pole interrupting contacts includes a first tri-contact member configured to provide electrical continuity between the hot line terminal, the hot load terminal, and the hot user-accessible load terminal in a coupled state and cause electrical discontinuity between the hot line terminal, the hot load terminal, and the hot user-accessible load terminal in a tripped state, the four-pole interrupting contacts also including a second tri-contact member configured to provide electrical continuity between the neutral line terminal, the neutral load terminal, and the neutral user-accessible load terminal in a coupled state and cause electrical discontinuity between the neutral line terminal, the neutral load terminal, and the neutral user-accessible load terminal in a tripped state.

14. The device of claim 13, wherein the first tri-contact member further comprises:

a first platform including three contacts disposed thereon, a first contact being aligned with a hot line contact, a second contact being aligned with a hot load contact, and a third line being aligned with a hot user-accessible load contact;

a first axial member coupled to the platform;

a first spring coupled to the axial member, the spring being configured to exert a first force tending to drive the platform into the tripped state causing electrical discontinuity between the hot line terminal, the hot load terminal, and the hot user-accessible load terminal; and a latch member coupled to the fault detection circuit, the latch member being configured to exert a second force greater than the first force, tending to drive the platform into the coupled state providing electrical continuity between the hot line terminal, the hot load terminal, and the hot user-accessible load terminal.

15. The device of claim 14, wherein the second tri-contact member further comprises:

a second platform including three contacts disposed thereon, a first contact being aligned with a neutral line contact, a second contact being aligned with a neutral load contact, and a third line being aligned with a neutral user-accessible load contact;

a second axial member coupled to the platform;

a second spring coupled to the axial member, the spring being configured to exert a first force tending to drive the platform into the tripped state causing electrical discontinuity between the neutral line terminal, the neutral load terminal, and the neutral user-accessible load terminal; and wherein the latch member is configured to exert a second force greater than the first force, tending to drive the platform into the coupled state providing electrical continuity between the neutral line terminal, the neutral load terminal, and the neutral user-accessible load terminal.

16. The device of claim 15, wherein the reset stimulus is a mechanical force configured to drive the first latch member and the second latch member into the coupled state.

17. The device of claim 13, further comprising a test mechanism configured to generate a simulated fault signal.

18. The device of claim 1, wherein the fault detection circuit includes a miswire detection circuit, the miswire detection circuit being configured to detect a condition wherein AC power is applied to the load terminals.

19. The device of claim 1, wherein four-pole interrupting contact assembly further comprises:

a hot cantilever assembly including a hot line cantilever connected to the hot line terminal and including a first hot contact disposed thereon, a fixed second hot contact coupled to the hot user-accessible load terminal, and a hot load cantilever connected to the hot load terminal and including a third hot contact disposed thereon, the first hot contact, the second hot contact, and the third hot contact being aligned and configured to provide electrical continuity between the hot line terminal, the hot load terminal, and the hot user-accessible load terminal in a coupled state and cause electrical discontinuity between the hot line terminal, the hot load terminal, and the hot user-accessible load terminal in a tripped state, and a neutral cantilever assembly including a neutral line cantilever connected to the neutral line terminal and including a first neutral contact disposed thereon, a fixed second neutral contact coupled to the neutral user-accessible load terminal, and a neutral load cantilever connected to the neutral load terminal and including a third neutral contact disposed thereon, the first neutral contact, the second neutral contact, and the third neutral contact being aligned and configured to provide electrical continuity between the neutral line terminal, the neutral load terminal, and the neutral user-accessible load terminal in a coupled state and cause electrical discontinuity between the neutral line terminal, the neutral load terminal, and the neutral user-accessible load terminal in a tripped state.

20. The device of claim 19, wherein the hot load cantilever is disposed between the hot line cantilever and the fixed second hot contact.

21. The device of claim 20, wherein the third hot contact is configured as a dual contact including a hot line contact portion configured to mate with the first hot contact and a user-accessible contact portion configured to mate with the fixed second hot contact.

22. The device of claim 19, wherein the neutral load cantilever is disposed between the neutral line cantilever and the fixed second neutral contact.

23. The device of claim 20, wherein the third neutral contact is configured as a dual contact including a neutral line contact portion configured to mate with the first neutral contact and a user-accessible contact portion configured to mate with the fixed second neutral contact.

24. The device of claim 1, wherein the reset stimulus includes a mechanical force generated in response to the actuation of the reset button.

25. The device of claim 1, wherein the reset stimulus includes an electrical signal generated in response to the actuation of the reset button.

26. The device of claim 1, wherein the reset actuator includes a reset solenoid, the reset solenoid does not drive the armature.

27. The device of claim 1, wherein the reset mechanism does not include a lockout mechanism.

28. The device of claim 1, wherein the reset mechanism does not respond to a force generated by the at least one solenoid.

29. An electrical wiring device comprising:

a housing assembly including at least one user-accessible receptacle, the at least one user-accessible receptacle being configured to receive plug contact blades inserted therein, the housing assembly including a hot line terminal, a neutral line terminal, a hot load terminal, and a neutral load terminal;

at least one set of receptacle contacts disposed in the housing assembly and in communication with the at least one user-accessible receptacle, the at least one set of receptacle contacts including a hot user-accessible load contact and a neutral user accessible load contact;

a test assembly coupled to the hot line terminal and the neutral line terminal, the test assembly being configured to generate a simulated fault condition;

a fault detection circuit coupled to the test assembly, the fault detection circuit being configured to detect at least one fault condition and provide a fault detect signal in response thereto, the at least one fault condition including the simulated fault condition;

a set of four-pole interrupting contacts coupled to the fault detection circuit, the set of four-pole interrupting contacts including a set of four-pole interrupting contacts having a first pair of hot contacts coupling the hot line terminal and the hot load terminal, a second pair of hot contacts coupling the hot line terminal to the hot user-accessible load contact, a first pair of neutral contacts coupling the neutral line terminal and the neutral load terminal, and a second pair of neutral contacts coupling the neutral line terminal to the neutral user-accessible load contact, the set of four-pole interrupting contacts being configured to provide electrical continuity between the first pair of hot contacts, the second pair of hot contacts, the first pair of neutral contacts, and the second pair of neutral contacts in a coupled state and cause electrical discontinuity between the first pair of hot contacts, the second pair of hot contacts, the first pair of neutral contacts, and the second pair of neutral contacts in a tripped state; and an end-of-life mechanism coupled to the test assembly, the end-of-mechanism including an end-of-life circuit, a third pair of hot contacts coupling the hot line terminal and the hot load terminal, and a third pair of neutral contacts coupling the neutral line terminal and the neutral load terminal, the end-of-life circuit being configured to decouple the third pair of hot contacts and the third pair of neutral contacts if the fault detection circuit fails to transmit the fault detection signal within a predetermined period of time after the simulated fault condition is generated, the end-of-life mechanism being independent of the set of four-pole interrupting contacts.

30. An electrical wiring protection device comprising:

a housing assembly including at least one user-accessible receptacle, the at least one user-accessible receptacle being configured to receive plug contact blades inserted therein, the housing assembly including a hot line terminal, a neutral line terminal, a hot load terminal, and a neutral load terminal;

at least one set of receptacle contacts disposed in the housing assembly and in communication with the at least one user-accessible receptacle, the at least one set of receptacle contacts including a hot user-accessible load terminal and a neutral user accessible load terminal;

a fault detection circuit coupled to the hot line terminal and the neutral line terminal, the fault detection circuit being configured to detect at least one fault condition and provide a fault detect signal in response thereto; and a four-pole interrupting contact assembly coupled to the fault detection circuit, the four-pole interrupting contact assembly including, a first cantilever connected to the hot line terminal at a first end and including a first cantilever contact disposed thereon at a second end, the first cantilever contact and a hot load terminal contact forming a first contact pair of hot contacts configured to couple the hot line terminal and the hot load terminal, a second cantilever connected to the hot line terminal at the first end and including a second cantilever contact disposed thereon at the second end, the second cantilever contact and a hot user-accessible load contact forming a second contact pair of hot contacts configured to couple the hot line terminal and the hot user-accessible load terminal, a third cantilever connected to the neutral line terminal at a first end and including a third cantilever contact disposed thereon at the second end, the third cantilever contact and a neutral load terminal contact forming a first contact pair of neutral contacts configured to couple the neutral line terminal and the neutral load terminal, a fourth cantilever connected to the neutral line terminal at the first end and including a fourth cantilever contact disposed thereon at the second end, the fourth cantilever contact and a neutral user-accessible load contact forming a second contact pair of neutral contacts configured to couple the neutral line terminal and the neutral user-accessible load terminal, and a pivoting latch mechanism configured to drive the first cantilever, the second cantilever, the third cantilever, and the fourth cantilever between a coupled state and a tripped state, whereby the first pair of hot contacts, the second pair of hot contacts, the first pair of neutral contacts, and the second pair of neutral contacts are tripped in response to the fault detect signal.

31. The device of claim 30, further comprising at least one user actuated assembly including a test mechanism and a reset mechanism each coupled to the set of four-pole interrupting contacts, the test mechanism being configured to mechanically drive the set of four-pole interrupting contacts into a tripped state, the reset mechanism being independent of the test mechanism and configured to reset the set of four-pole interrupting contacts.

32. The device of claim 31, wherein the reset mechanism includes a reset button coupled to a pair of test contacts, the at least one user actuated assembly generating the simulated fault condition in response to the pair of test contacts being closed.

33. The device of claim 31, wherein the pivoting latch mechanism is coupled to the first cantilever, second cantilever, third cantilever, and the fourth cantilever, the latch mechanism being configured to open the set of four-pole interrupting contacts in response to the fault detect signal.

34. The device of claim 33, wherein the pivoting latch mechanism includes a first solenoid configured to move the first cantilever, second cantilever, third cantilever, and the fourth cantilever in a first direction to thereby reestablish electrical continuity between the first pair of hot contacts, the second pair of hot contacts, the first pair of neutral contacts, and the second pair of neutral contacts.

35. The device of claim 34, wherein the reset solenoid includes a pair of test contacts coupled to the at least one user actuated assembly, the at least one user actuated assembly generating the simulated fault condition in response to the pair of test contacts being closed.

36. The device of claim 35, wherein the first solenoid is not actuated to reestablish electrical continuity between the first pair of hot contacts, the second pair of hot contacts, the first pair of neutral contacts, and the second pair of neutral contacts if the fault detection circuit fails to respond to the simulated fault condition.

37. The device of claim 33, wherein the latch mechanism includes a second solenoid configured to drive the first cantilever, second cantilever, third cantilever, and the fourth cantilever in a second direction to cause electrical discontinuity between the first pair of hot contacts, the second pair of hot contacts, the first pair of neutral contacts, and the second pair of neutral contacts.

38. The device of claim 33, wherein the pivoting latch mechanism further comprises:

a latch toggle mechanism including a first arm and a second arm in a fixed positional relationship about an axis of rotation, the first arm being coupled to the first cantilever, second cantilever, third cantilever, and the fourth cantilever;

a first solenoid configured to apply a first force to the second arm to thereby move the first arm and the second arm in a first direction about the axis of rotation, the first arm driving the first cantilever, second cantilever, third cantilever, and the fourth cantilever in response thereto, whereby electrical continuity between the first pair of hot contacts, the second pair of hot contacts, the first pair of neutral contacts, and the second pair of neutral contacts is reestablished; and a second solenoid configured to apply a second force to the first arm to thereby move the first arm and the second arm in a second direction about the axis of rotation, the first arm driving the first cantilever, second cantilever, third cantilever, and the fourth cantilever in response thereto, whereby electrical continuity between the first pair of hot contacts, the second pair of hot contacts, the first pair of neutral contacts, and the second pair of neutral contacts is broken.

39. The device of claim 38, wherein the first solenoid is not actuated to reestablish electrical continuity between the first pair of hot contacts, the second pair of hot contacts, the first pair of neutral contacts, and the second pair of neutral contacts if the fault detection circuit fails to respond to the simulated fault condition.

40. The device of claim 30, further comprising an end-of-life mechanism coupled to the at least one user actuated assembly, the end-of-mechanism including an end-of-life circuit, a third pair of hot contacts coupling the hot line terminal and the hot load terminal, and a third pair of neutral contacts coupling the neutral line terminal and the neutral load terminal, the end-of-life circuit being configured to decouple the third pair of hot contacts and the third pair of neutral contacts if the fault detection circuit fails to transmit the fault detection signal within a predetermined period of time after the simulated fault condition is generated, the end-of-life mechanism being independent of the set of four-pole interrupting contacts.

41. The device of claim 30, further comprising a miswire detection circuit, the miswire detection circuit being configured to detect a miswire condition wherein AC power is applied to the load terminals, whereby the first pair of hot contacts, the second pair of hot contacts, the first pair of neutral contacts, and the second pair of neutral contacts are decoupled in response to the miswire condition being detected.

42. The device of claim 30, further comprising a test mechanism that includes a circuit configured to introduce a simulated ground fault during a predetermined half-cycle of each AC power period.

43. An electrical wiring protection device comprising:

a housing assembly including at least one user-accessible receptacle, the at least one user-accessible receptacle being configured to receive plug contact blades inserted therein, the housing assembly including a hot line terminal, a neutral line terminal, a hot load terminal, and a neutral load terminal;

at least one set of receptacle contacts disposed in the housing assembly and in communication with the at least one user-accessible receptacle, the at least one set of receptacle contacts including a hot user-accessible load terminal and a neutral user accessible load terminal;

a fault detection circuit coupled to the test assembly, the fault detection circuit being configured to detect at least one fault condition and provide a fault detect signal in response thereto, the at least one fault condition including the simulated fault condition; and a four-pole interrupting contact assembly coupled to the fault detection circuit, the four-pole interrupting contacts including a hot tri-contact member configured to provide electrical continuity between the hot line terminal, the hot load terminal, and the hot user-accessible load terminal in a coupled state and cause electrical discontinuity between the hot line terminal, the hot load terminal, and the hot user-accessible load terminal in a tripped state, the four-pole interrupting contacts also including a neutral tri-contact member configured to provide electrical continuity between the neutral line terminal, the neutral load terminal, and the neutral user-accessible load terminal in a coupled state and cause electrical discontinuity between the neutral line terminal, the neutral load terminal, and the neutral user-accessible load terminal in a tripped state.

44. The device of claim 43, wherein the first tri-contact member further comprises:

a platform including three contacts disposed thereon, a first contact being aligned with a hot line contact, a second contact being aligned with a hot load contact, and a third line being aligned with a hot user-accessible load contact;

an axial member coupled to the platform;

a spring coupled to the axial member, the spring being configured to exert a first force tending to drive the platform into the tripped state causing electrical discontinuity between the hot line terminal, the hot load terminal, and the hot user-accessible load terminal; and a latch member coupled to the fault detection circuit, the latch member being configured to exert a second force greater than the first force, tending to drive the platform into the coupled state providing electrical continuity between the hot line terminal, the hot load terminal, and the hot user-accessible load terminal.

45. The device of claim 44, wherein the second tri-contact member further comprises:

a platform including three contacts disposed thereon, a first contact being aligned with a neutral line contact, a second contact being aligned with a neutral load contact, and a third line being aligned with a neutral user-accessible load contact;

an axial member coupled to the platform;

a spring coupled to the axial member, the spring being configured to exert a first force tending to drive the platform into the tripped state causing electrical discontinuity between the neutral line terminal, the neutral load terminal, and the neutral user-accessible load terminal; and a latch member coupled to the fault detection circuit, the latch member being configured to exert a second force greater than the first force, tending to drive the platform into the coupled state providing electrical continuity between the neutral line terminal, the neutral load terminal, and the neutral user-accessible load terminal.

46. The device of claim 43, further comprising:

a test assembly coupled to the fault detection circuit and configured to generate a simulated fault signal; and a mechanical reset mechanism coupled to the four-pole interrupting contact assembly and configured to drive the four-pole interrupting contact assembly from the tripped state to the coupled state.

47. The device of claim 46, wherein electrical continuity in the four-pole interrupting contacts is not reestablished if the fault detection circuit fails to respond to the simulated fault condition.

48. The device of claim 46, wherein the test mechanism includes a circuit configured to introduce a simulated ground fault during a predetermined half-cycle of each AC power period.

49. The device of claim 48, wherein the four-pole interrupting contacts are tripped if the fault detect circuit fails to detect the simulated ground fault.

50. The device of claim 43, wherein the fault detection circuit includes a miswire detection circuit, the miswire detection circuit being configured to detect a condition wherein AC power is applied to the load terminals.

51. The device of claim 44, wherein the four-pole interrupting contact assembly is driven to the tripped state in response to detecting the miswire condition.

52. An electrical wiring protection device comprising:

a housing assembly including at least one user-accessible receptacle, the at least one user-accessible receptacle being configured to receive plug contact blades inserted therein, the housing assembly including a hot line terminal, a neutral line terminal, a hot load terminal, and a neutral load terminal;

at least one set of receptacle contacts disposed in the housing assembly and in communication with the at least one user-accessible receptacle, the at least one set of receptacle contacts including a hot user-accessible load terminal and a neutral user accessible load terminal;

a fault detection circuit coupled to the test assembly, the fault detection circuit being configured to detect at least one fault condition and provide a fault detect signal in response thereto, the at least one fault condition including the simulated fault condition; and a four-pole interrupting contact assembly coupled to the fault detection circuit, the four-pole interrupting contacts including, a hot cantilever assembly including a hot line cantilever connected to the hot line terminal and including a first hot contact disposed thereon, a fixed second hot contact coupled to the hot user-accessible load terminal, and a hot load cantilever connected to the hot load terminal and including a third hot contact disposed thereon, the first hot contact, the second hot contact, and the third hot contact being aligned and configured to provide electrical continuity between the hot line terminal, the hot load terminal, and the hot user-accessible load terminal in a coupled state and cause electrical discontinuity between the hot line terminal, the hot load terminal, and the hot user-accessible load terminal in a tripped state, and a neutral cantilever assembly including a neutral line cantilever connected to the neutral line terminal and including a first neutral contact disposed thereon, a fixed second neutral contact coupled to the neutral user-accessible load terminal, and a neutral load cantilever connected to the neutral load terminal and including a third neutral contact disposed thereon, the first neutral contact, the second neutral contact, and the third neutral contact being aligned and configured to provide electrical continuity between the neutral line terminal, the neutral load terminal, and the neutral user-accessible load terminal in a coupled state and cause electrical discontinuity between the neutral line terminal, the neutral load terminal, and the neutral user-accessible load terminal in a tripped state.

53. The device of claim 52, wherein the hot load cantilever is disposed between the hot line cantilever and the fixed second hot contact.

54. The device of claim 53, wherein the third hot contact is configured as a dual contact including a hot line contact portion configured to mate with the first hot contact and a user-accessible contact portion configured to mate with the fixed second hot contact.

55. The device of claim 52, wherein the neutral load cantilever is disposed between the neutral line cantilever and the fixed second neutral contact.

56. The device of claim 55, wherein the third neutral contact is configured as a dual contact including a neutral line contact portion configured to mate with the first neutral contact and a user-accessible contact portion configured to mate with the fixed second neutral contact.

57. The device of claim 52, wherein the fault detection circuit includes a miswire detection circuit, the miswire detection circuit being configured to detect a condition wherein AC power is applied to the load terminals.

58. The device of claim 57, wherein the four-pole interrupting contact assembly is driven to the tripped state in response to detecting the miswire condition.

59. The device of claim 52, further comprising a test mechanism configured to generate a simulated fault signal.

60. The device of claim 59, wherein the four-pole interrupting contacts are tripped if the fault detect circuit fails to detect the simulated fault signal.

61. The device of claim 59, wherein the test mechanism includes a circuit configured to introduce a simulated ground fault during a predetermined half-cycle of each AC power period.

62. The device of claim 61, wherein the four-pole interrupting contacts are tripped if the fault detect circuit fails to detect the simulated ground fault.

63. The device of claim 52, further comprising a mechanical reset mechanism configured to drive the four-pole interrupting contacts into the coupled state in response to a user stimulus.

* * * * *

US007154718C1

(12) EX PARTE REEXAMINATION CERTIFICATE (8824th)

United States Patent

Finlay, Sr. et al.

(10) Number: US 7,154,718 C1

(45) Certificate Issued: Jan. 24, 2012

(54) PROTECTION DEVICE WITH POWER TO RECEPTACLE CUT-OFF

(75) Inventors: David A. Finlay, Sr., Marietta, NY (US); Kent Morgan, Groton, NY (US); Patrick J. Murphy, Marcellus, NY (US); Dejan Radosavljevic, Syracuse, NY (US); Jeffrey C. Richards, Baldwinsville, NY (US); Gerald R. Savicki, Jr., Canastota, NY (US); Richard Weeks, Little York, NY (US); Gary Wilson, Syracuse, NY (US)

(73) Assignee: Pass & Seymour, Inc., Syracuse, NY (US)

Reexamination Request:
No. 90/011,074, Jun. 30, 2010

Reexamination Certificate for:

| | |
|---|---|
| Patent No.: | **7,154,718** |
| Issued: | **Dec. 26, 2006** |
| Appl. No.: | **10/900,769** |
| Filed: | **Jul. 28, 2004** |

(51) Int. Cl.
*H02H 3/00* (2006.01)

(52) U.S. Cl. ........................................................ 361/42

(58) Field of Classification Search ..................... 361/42
See application file for complete search history.

(56) References Cited

To view the complete listing of prior art documents cited during the proceeding for Reexamination Control Number 90/011,074, please refer to the USPTO's public Patent Application Information Retrieval (PAIR) system under the Display References tab.

*Primary Examiner*—Linh M. Nguyen

(57) ABSTRACT

The present invention is directed to an electrical wiring protection device that includes a housing assembly having at least one receptacle. The receptacle is configured to receive plug contact blades inserted therein. The housing assembly includes a hot line terminal, a neutral line terminal, a hot load terminal, and a neutral load terminal. A set of receptacle contacts is disposed in the housing assembly and in communication with the receptacle. The receptacle contacts includes a hot user-accessible load contact and a neutral user accessible load contact. A fault detection circuit is coupled to the test assembly. The fault detection circuit is configured to detect at least one fault condition and provide a fault detect signal in response thereto. A four-pole interrupting contact assembly is coupled to the fault detection circuit and includes a set of four-pole interrupting contacts. A reset mechanism is coupled to the four-pole interrupting contact assembly. The reset mechanism includes a reset button and a reset actuator configured to reestablish electrical continuity between the first pair of hot contacts, the second pair of hot contacts, the first pair of neutral contacts, and the second pair of neutral contacts in response to a reset stimulus.

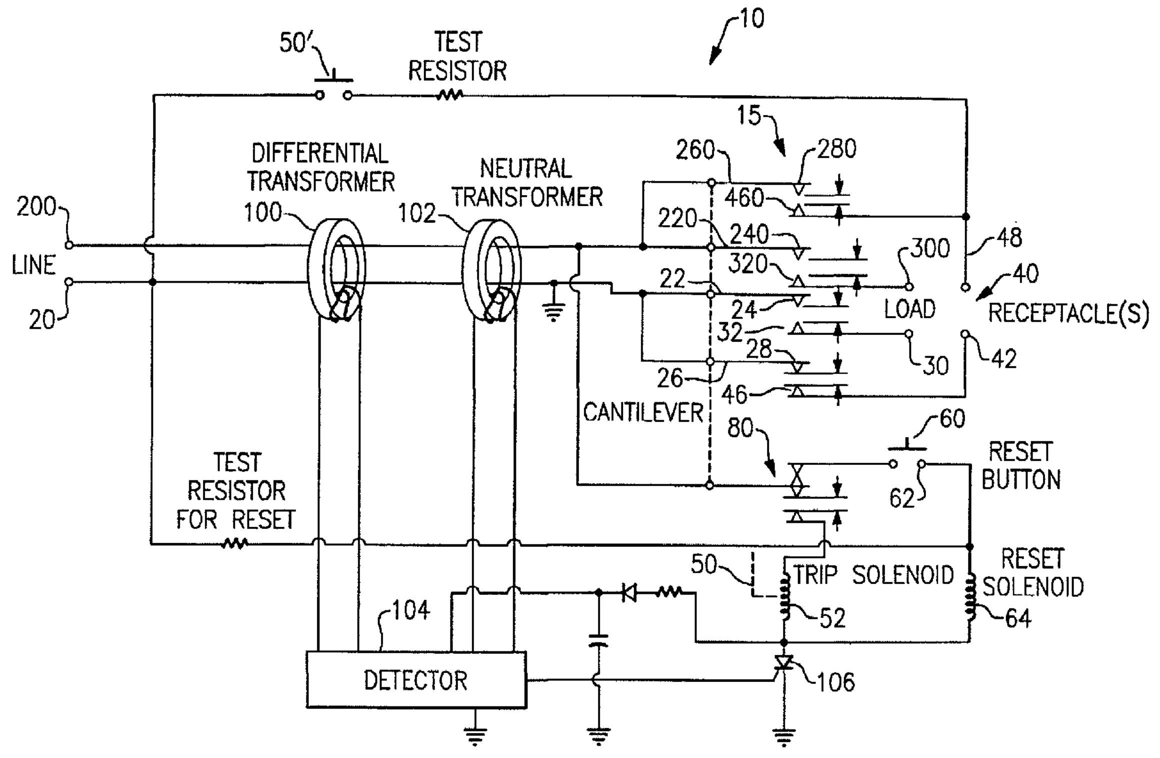

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 52, 59 and 63 are determined to be patentable as amended.

Claims 57 and 58 dependent on an amended claim, are determined to be patentable.

Claims 1-51, 53-56 and 60-62 were not reexamined.

52. An electrical wiring protection device comprising:

a housing assembly including at least one user-accessible receptacle, the at least one user-accessible receptacle being configured to receive plug contact blades inserted therein, the housing assembly including a hot line terminal, a neutral line terminal, a hot load terminal, and a neutral load terminal;

at least one set of receptacle contacts disposed in the housing assembly and in communication with the at least one user-accessible receptacle, the at least one set of receptacle contacts including a hot user-accessible load terminal and a neutral user accessible load terminal;

a fault detection circuit coupled to [the] *a* test assembly, the fault detection circuit being configured to detect at least one fault condition and provide a fault detect signal in response thereto, the at least one fault condition including [the] *a* simulated fault condition; and a four-pole interrupting contact assembly coupled to the fault detection circuit, the four-pole interrupting contacts including, a hot cantilever assembly including [a] *an elongated, flexible* hot line cantilever connected to the hot line terminal and including a first hot contact disposed thereon, a fixed second hot contact coupled to the hot user-accesible load terminal, and a*n elongated, flexible* hot load cantilever connected to the hot load terminal and including a third hot contact disposed thereon, the first hot contact, the second hot contact, and the third hot contact being aligned and configured to provide electrical continuity between the hot line terminal, the hot load terminal, and the hot user-accessible load terminal in a coupled state and cause electrical discontinuity between the hot line terminal, the hot load terminal, and the hot user-accessible load terminal in a tripped state, and a neutral cantilever assembly including [a] *an elongated, flexible* neutral line cantilever connected to the neutral line terminal and including a first neutral contact disposed thereon, a fixed second neutral second neutral contact coupled to the neutral user-accessible load terminal, and [a] *an elongated, flexible* neutral load cantilever connected to the neutral load terminal and including a third neutral contact disposed thereon, the first neutral contact, the second neutral contact, and the third neutral contact being aligned and configured to provide electrical continuity between the neutral line terminal, the neutral load terminal, and the neutral user-accessible load terminal in a coupled state and cause electrical discontinuity between the neutral line terminal, the neutral load terminal, and the neutral user-accessible load terminal in a tripped state.

59. The device of claim 52, [further comprising] *wherein the test assembly includes* a test mechanism configured to generate a simulated fault signal.

63. The device of claim 52, further comprising a mechanical reset mechanism configured to drive the four-pole interrupting contacts into the coupled state in response to a user stimulus*, the reset mechanism not generating the simulated fault condition.*

* * * * *